US011755812B2

(12) United States Patent
Peng et al.

(10) Patent No.: US 11,755,812 B2
(45) Date of Patent: Sep. 12, 2023

(54) POWER STRUCTURE WITH POWER PICK-UP CELL CONNECTING TO BURIED POWER RAIL

(71) Applicant: TAIWAN SEMICONDUCTOR MANUFACTURING COMPANY, LTD., Hsinchu (TW)

(72) Inventors: Shih-Wei Peng, Hsinchu (TW); Wei-Cheng Lin, Hsinchu (TW); Jiann-Tyng Tzeng, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 266 days.

(21) Appl. No.: 17/342,137

(22) Filed: Jun. 8, 2021

(65) Prior Publication Data

US 2021/0294962 A1 Sep. 23, 2021

Related U.S. Application Data

(62) Division of application No. 16/460,656, filed on Jul. 2, 2019, now Pat. No. 11,055,469.

(60) Provisional application No. 62/712,965, filed on Jul. 31, 2018.

(51) Int. Cl.
| | | |
|---|---|---|
| G06F 30/39 | (2020.01) | |
| G06F 30/398 | (2020.01) | |
| G03F 1/82 | (2012.01) | |
| G03F 1/70 | (2012.01) | |
| G03F 1/36 | (2012.01) | |

(52) U.S. Cl.
CPC .............. *G06F 30/398* (2020.01); *G03F 1/36* (2013.01); *G03F 1/70* (2013.01); *G03F 1/82* (2013.01)

(58) Field of Classification Search
CPC ...... G06F 30/398; G06F 2119/06; G03F 1/36; G03F 1/70; G03F 1/82; H01L 27/0207; H01L 23/50
USPC ......................................................... 716/51
See application file for complete search history.

(56) References Cited

U.S. PATENT DOCUMENTS

| | | | |
|---|---|---|---|
| 7,260,442 B2 | 8/2007 | Hwang et al. | |
| 9,256,709 B2 | 2/2016 | Yu et al. | |
| 2014/0040838 A1 | 2/2014 | Liu et al. | |
| 2015/0278429 A1 | 10/2015 | Chang | |
| 2015/0371959 A1 | 12/2015 | Frederick, Jr. et al. | |
| 2019/0155979 A1 | 5/2019 | Schultz | |
| 2020/0082045 A1 | 3/2020 | Lee | |
| 2022/0147679 A1* | 5/2022 | Edathil | G06F 30/398 |

\* cited by examiner

*Primary Examiner* — Paul Dinh
(74) *Attorney, Agent, or Firm* — Hauptman Ham, LLP

(57) ABSTRACT

An integrated circuit includes a first buried power rail, a second buried power rail, a first power pad in a first metal layer, and a first conductive segment beneath the first metal layer. The first buried power rail and the second buried power rail are both located beneath the first metal layer. The first power pad is configured to receive a first supply voltage through at least one first via. The first conductive segment is conductively connected to the first power pad through at least one second via between the first conductive segment and the first metal layer. The first conductive segment is conductively connected to the first buried power rail through at least one third via between the first conductive segment and the first buried power rail.

20 Claims, 35 Drawing Sheets

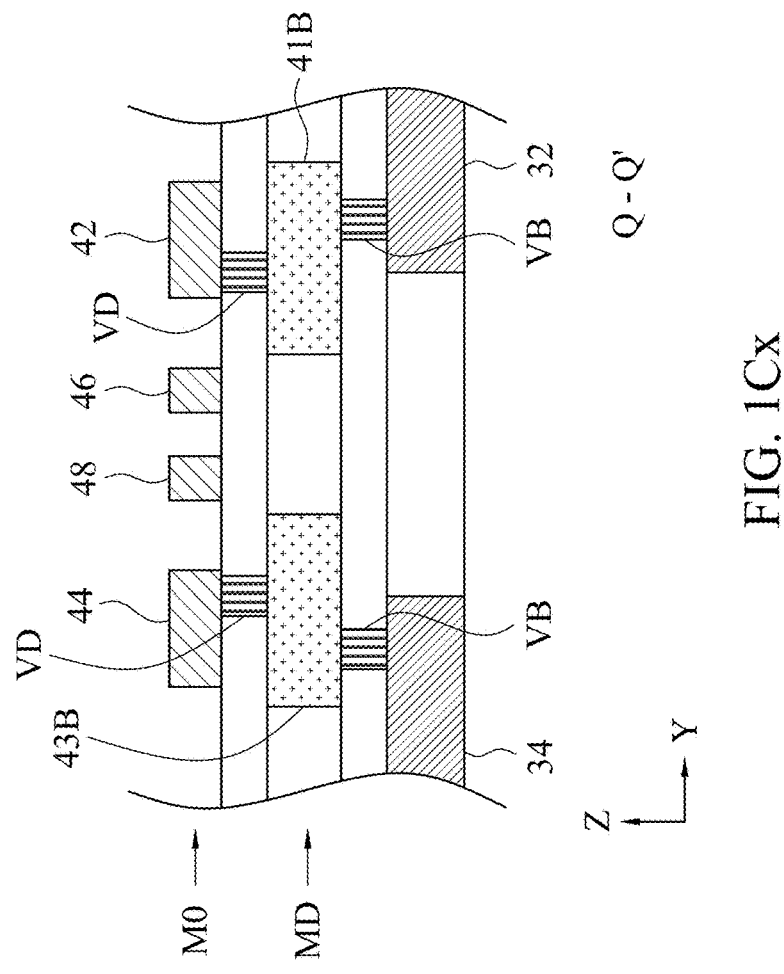
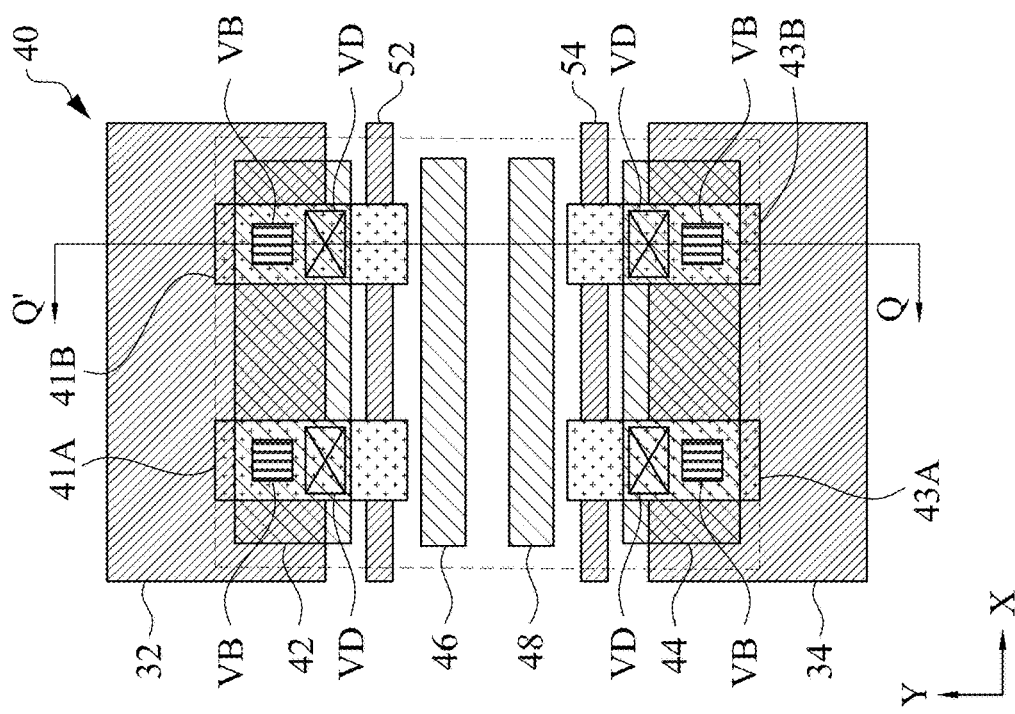
FIG. 1Cx
FIG. 1C

POWER STRUCTURE WITH POWER PICK-UP CELL CONNECTING TO BURIED POWER RAIL

PRIORITY CLAIM

The present application is a continuation of U.S. application Ser. No. 16/460,656, filed Jul. 2, 2019, which claims the priority of U.S. Provisional Application No. 62/712,965, filed Jul. 31, 2018, each of which is incorporated herein by reference in its entirety.

BACKGROUND

The recent trend in miniaturizing integrated circuits (ICs) has resulted in smaller devices which consume less power yet provide more functionality at higher speeds. The miniaturization process has also resulted in more strict restriction on the layout design of the IC circuits. During the layout design of the IC circuits, the standard cells are often placed and routed to form functional circuits. In some layout designs, buried power rails are used to provide power to the standard cells, and various power structure designs can be used to bring power to the buried power rails from a corresponding power source.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1B-1C and FIGS. 1Bx-1Cx are plan views and corresponding cross-sectional views of a power pick-up cell, in accordance with some embodiments.

DETAILED DESCRIPTION

Figure 1A:
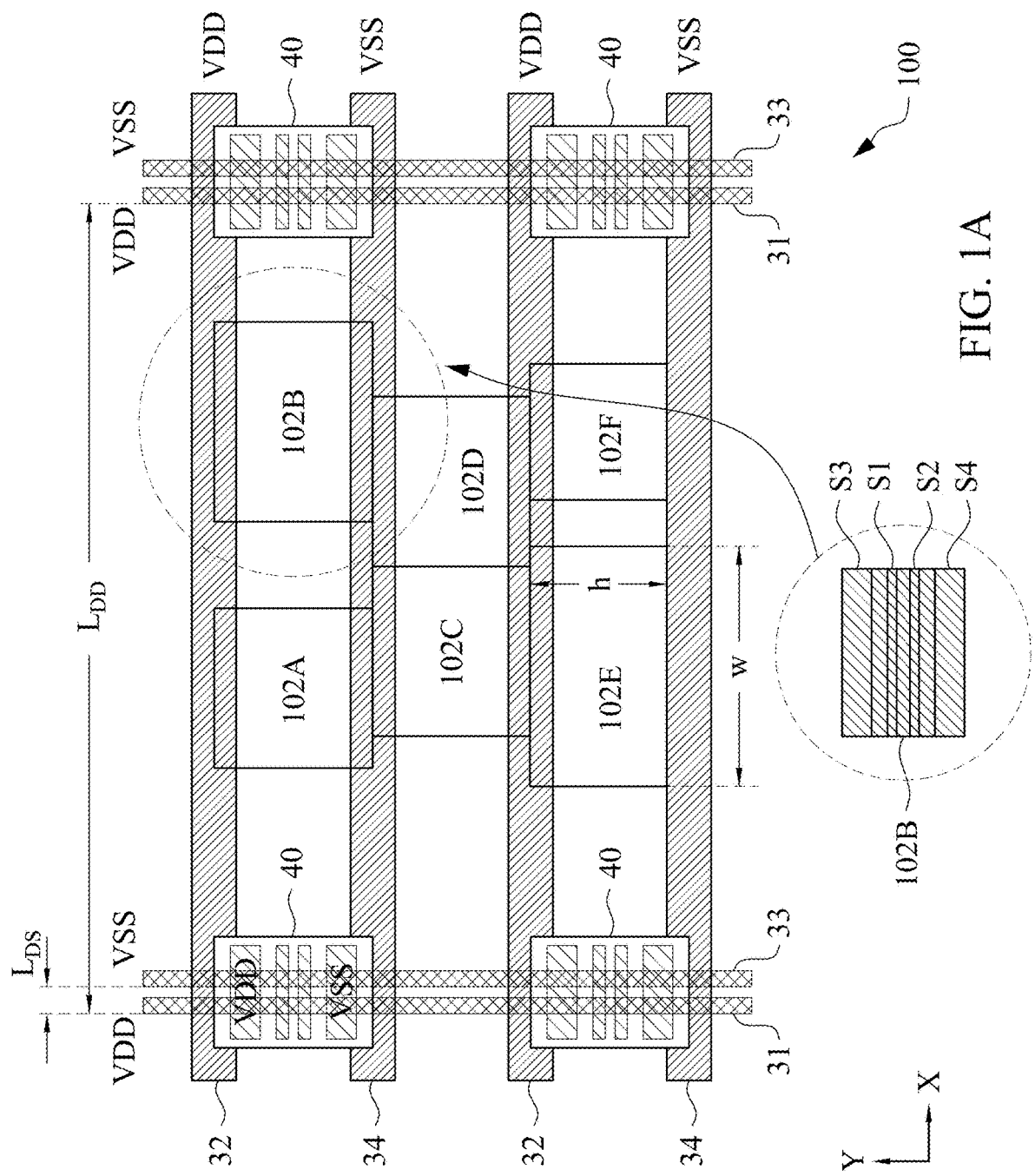
FIG. 1A is a schematic diagram of a section of a layout for an IC circuit, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s)

as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A is a schematic diagram of a section of a layout 100 for an IC circuit, in accordance with some embodiments. In FIG. 1A, arrays of first power rails 32 and second power rails 34 are arranged in parallel to provide the power needed by the standard cells in the IC circuit. The standard cells in the IC circuit are used as base elements for building the IC circuit. Functional circuits are formed from these standard cells after they are connected with routed connectors. A few examples of the standard cells used in the layout 100 are shown in FIG. 1A. Each of these standard cells (e.g., 102A, 102B, 102C, 102D, 102E, and 102F) is placed between one first power rail 32 and one second power rail 34. Each of the first power rails 32 is configured to be held at a first supply voltage VDD, and each of the second power rails 34 is configured to be held at a second supply voltage VSS. In some embodiments, the first supply voltage VDD is held at a positive voltage, while the second supply voltage VSS is held at ground voltage zero (0).

In FIG. 1A, each of the first power rails 32 and the second power rails 34 extends horizontally in the X-direction. Each of the standard cells has a height extending vertically in the Y-direction. For example, the standard cell 102E has a height "h." The number of horizontal routing tracks in a metal layer is limited by the height of the cell. In one example, the four horizontal routing tracks S1, S2, S3, and S4 of the cell 102B are shown in the inset of FIG. 1A. If two of the four horizontal routing tracks (e.g., S3 and S4) are used as the power rails (e.g., for providing supply voltages VDD and VSS), the two horizontal routing tracks (e.g., S3 and S4) extend horizontally and connect with the two corresponding horizontal routing tracks of other cells in the same row (e.g., cell 102A). After connection of S3 and S4 to provide power, only the remaining two horizontal routing tracks (e.g., S1 and S2) are used for horizontal signal routing in the same metal layer. In different arrangements, where the first power rail 32 and the second power rail 34 are implemented as buried power rails, all of the four horizontal routing tracks S1, S2, S3, and S4 of the cells are usable for horizontal signal routing in a same metal layer. Consequently, in FIG. 1A, the first power rails 32 and the second power rails 34 are correspondingly implemented as the first buried power rails 32 and the second buried power rails 34. The buried power rails are in a layer below the metal layer for the horizontal routing tracks S1, S2, S3, and S4.

In the embodiment shown in FIG. 1A, the standard cells for building a functional IC circuit are designed to be powered by the first buried power rails 32 and the second buried power rails 34, but the first supply voltage VDD on the first buried power rails 32 and the second supply voltage VSS on second buried power rails 34 are provided by additional power rails in a metal layer above the metal layer for the horizontal routing tracks S1, S2, S3, and S4. For example, the first supply voltage VDD is provided by an array of first upper power rails 31 extending in the Y-direction, and the second supply voltage VSS is provided by an array of second upper power rails 33 extending in the Y-direction.

In some embodiments, a first metal layer M0 is in a layer overlying the substrate for the transistors but the first metal layer M0 is below a second metal layer M1. In some embodiments, the horizontal routing tracks S1, S2, S3, and S4 are in the first metal layer M0, while the first upper power rails 31 and the second upper power rails 33 are in the second metal layer M1.

In FIG. 1A, multiple power pick-up cells 40 are placed at locations that overlap with a pair of the first upper power rail 31 and the second upper power rail 33 and overlap with a pair of the first buried power rail 32 and the second upper buried rail 34. With a power pick-up cell 40, a first upper power rail 31 is conductively connected to first buried power rails 32, to apply the first supply voltage VDD to the first buried power rails 32 from the first upper power rail 31; a second upper power rail 33 is conductively connected to a second buried power rails 34, to apply the second supply voltage VSS to the second buried power rails 34 from the second upper power rail 33.

Figure 1B:
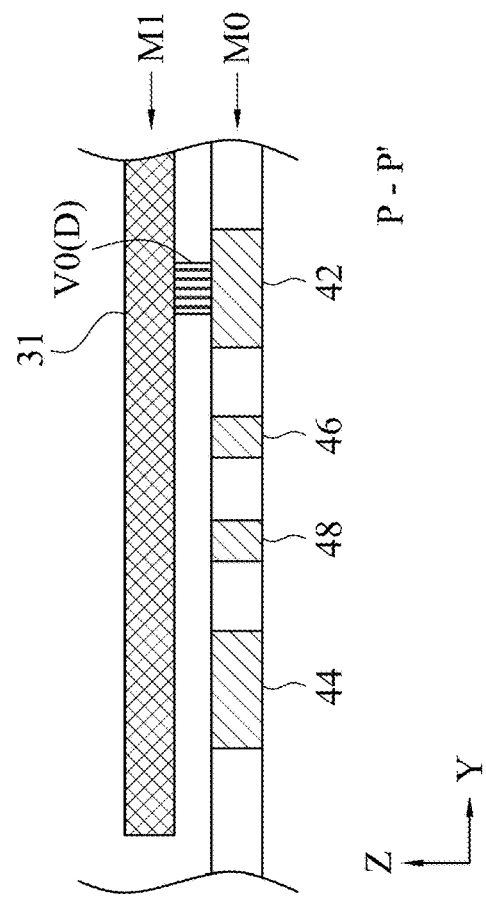
Figure 1B:
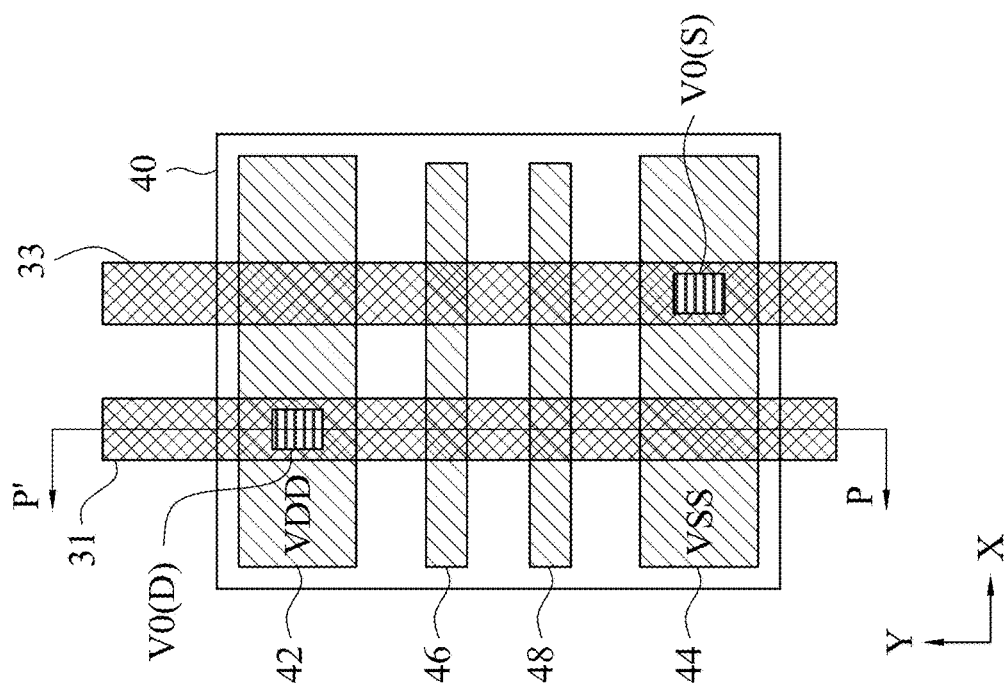

FIGS. 1B-1C and FIGS. 1Bx-1Cx are plan views and corresponding cross-sectional views of a power pick-up cell 40, in accordance with some embodiments. In FIG. 1B, the layouts of the power pick-up cell 40 in the layers between the second metal layer M1 and the first metal layer M0 are shown in a plan view. FIG. 1Bx is a cross-sectional view of the structure in FIG. 1B along line P-P'. As shown in FIG. 1B and FIG. 1Bx, the first upper power rail 31 and the second upper power rail 33, both extending in the Y-direction, are in the second metal layer M1. A first power pad 42, a second power pad 44, and two horizontal routing tracks (e.g., 46 and 48), extending in the X-direction, are in the first metal layer M0. As shown in FIG. 1B and FIG. 1Bx, the first upper power rail 31 is conductively connected to the first power pad 42 through a via V0(D) between the second metal layer M1 and the first metal layer M0. As shown in FIG. 1B, the second upper power rail 33 is conductively connected to the second power pad 44 through a via V0(S) between the second metal layer M1 and the first metal layer M0.

In FIG. 1C, the layout of the power pick-up cell 40 in the layers between the first metal layer M0 and the bottom layer of the buried power rails (e.g., 32 and 34) are shown in a plan view. FIG. 1Cx is a cross-sectional view of the structure in FIG. 1C along line Q-Q'. As shown in FIG. 1C and FIG. 1Cx, the first buried power rail 32 and the second buried power rail 34, both extend in the X-direction, and are beneath the first metal layer M0 which contains the first power pad 42 and the second power pad 44. Conductive segments 41A, 41B, 43A, and 43B are in a conductive layer MD located at a layer between the first metal layer M0 and the layer containing the buried power rails 32 and 34. The first power pad 42 is conductively connected to the conductive segments 41A and 41B through vias VD, and the second power pad 44 is conductively connected to the conductive segments 43A and 43B through additional vias VD. The vias VD pass through the insulation between the first metal layer M0 and the conductive layer MD. Furthermore, each of the conductive segments 41A and 41B is conductively connected to the first buried power rail 32 through vias VB, and each of the conductive segments 43A and 43B is conductively connected to the second buried power rail 34 through additional vias VB. The vias VB pass through the insulation between the conductive layer MD and the layer containing the buried power rails 32 and 34.

In FIG. 1B and FIG. 1Bx, the first upper power rail 31 and the second upper power rail 33 are correspondingly connected to the first power pad 42 and the second power pad 44 with conductive paths. In FIG. 1C and FIG. 1Cx, the first power pad 42 and the second power pad 44 are correspondingly connected to the first buried power rail 32 and the second buried power rail 34 with conductive paths. Consequently, the first upper power rail 31 is conductively connected to the first buried power rail 32, and the second upper power rail 33 is conductively connected to the second buried power rail 34. During operation, the first supply voltage VDD on the first upper power rail 31 is applied to the first buried power rail 32, and the second supply voltage VSS on the second upper power rail 33 is applied to the second buried power rail 34.

In the embodiment shown in FIGS. 1B-1C and FIGS. 1Bx-1Cx, the conductive connection between the first upper power rail 31 and the first buried power rail 32 relies upon two conductive segments 41A and 41B. In other embodiments, the first upper power rail 31 is conductively connected to the first buried power rail 32 through a single conductive segment in the conductive layer MD. Similarly, in other embodiments, instead of relying upon two conductive segments 43A and 43B, the second upper power rail 33 is conductively connected to the second buried power rail 34 through a single conductive segment in the conductive layer MD.

In FIGS. 1B-1C, each of the power pads (e.g., 42 or 44) has a height that is less than half of a height of the power pick-up cell 40. In some embodiments, each of the power pads (e.g., 42 or 44) has a width that is smaller than a width of the power pick-up cell 40, so that each of the power pads (e.g., 42 or 44) does not touch horizontal routing tracks in adjacent normal cells placed in the same row of a layout.

In some embodiments, as shown in FIGS. 1B-1C, the power pick-up cell 40 also includes active zones 52 and 54 extending in the X-direction. When a gate-strip crosses over an active zone, a transistor with its channel region beneath the gate-strip can be formed in the active zone. The source and the drain of the transistor are located at the active regions in the active zone on either sides of the gate-strip. In some embodiments, the power pick-up cell 40 does not have the active zones 52 and 54 inside the cell.

Figure 2A:
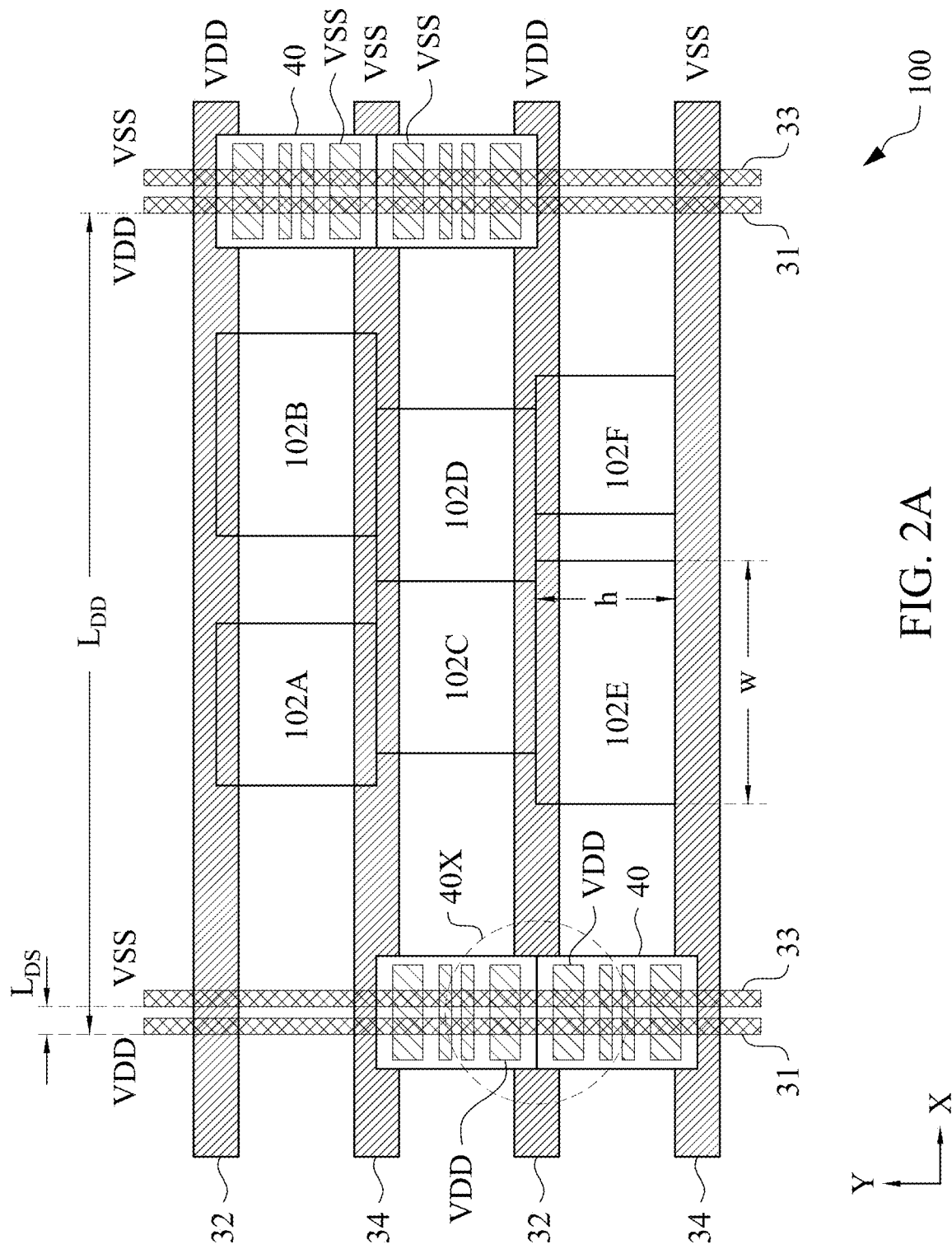
FIG. 2A is a schematic diagram of a section of a layout for an IC circuit, with another arrangement of the power pick-up cells, in accordance with some embodiments.
Figure 2B:
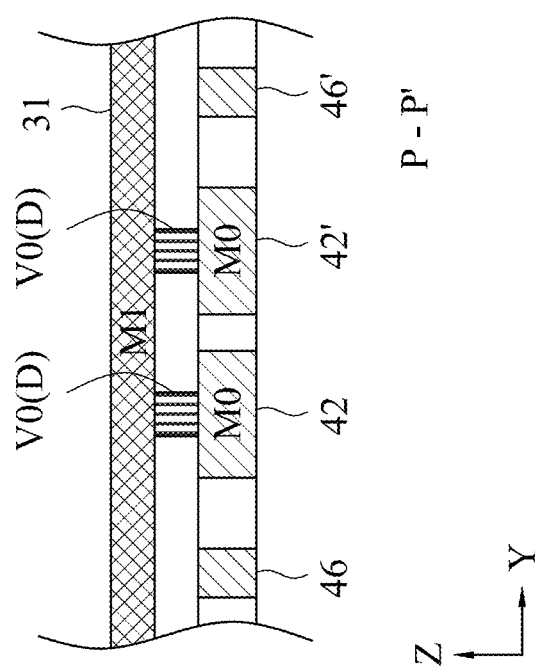
FIGS. 2B-2C and FIGS. 2Bx-2Cx are plan views and corresponding cross-sectional views of some parts of the abutting power pick-up cells, in accordance with some embodiments.
Figure 2B:
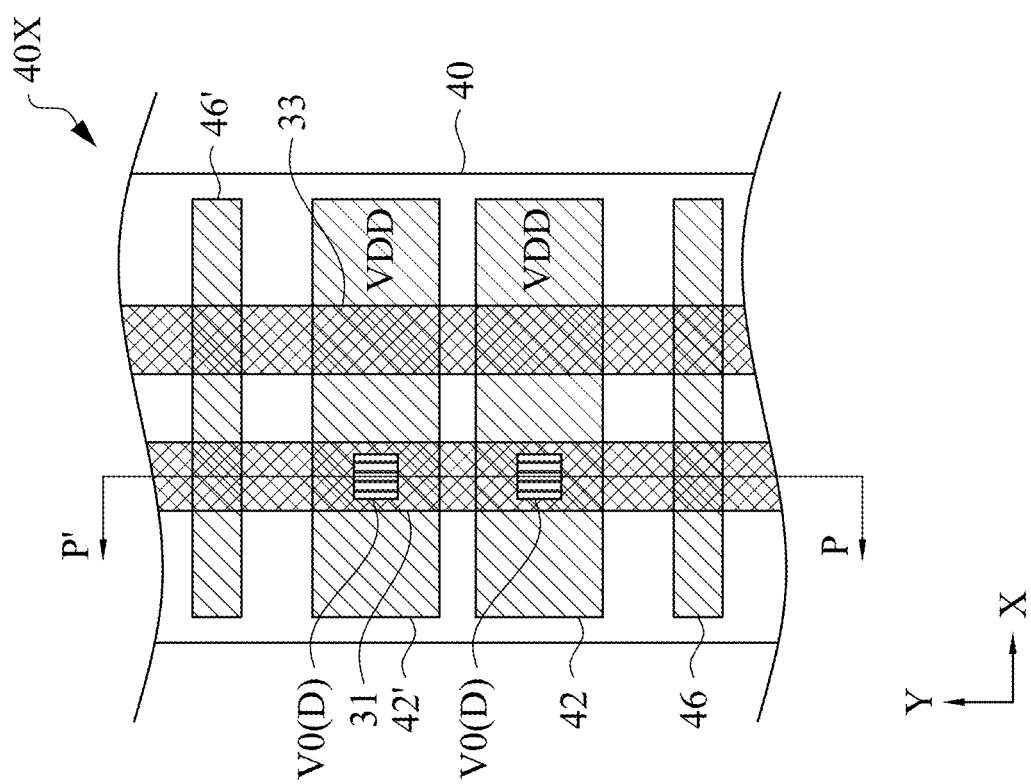
Figure 2C:
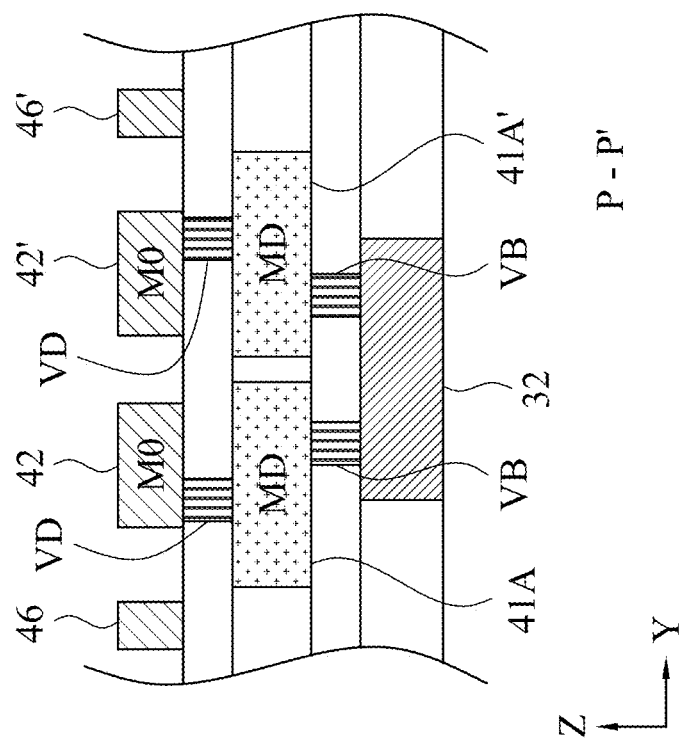
Figure 2C:
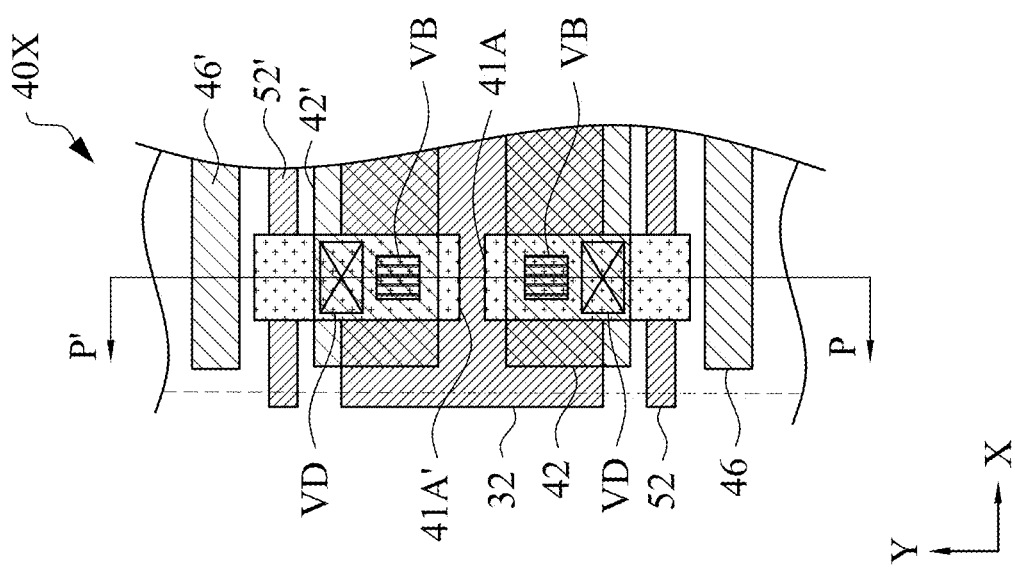
Figure 2D:
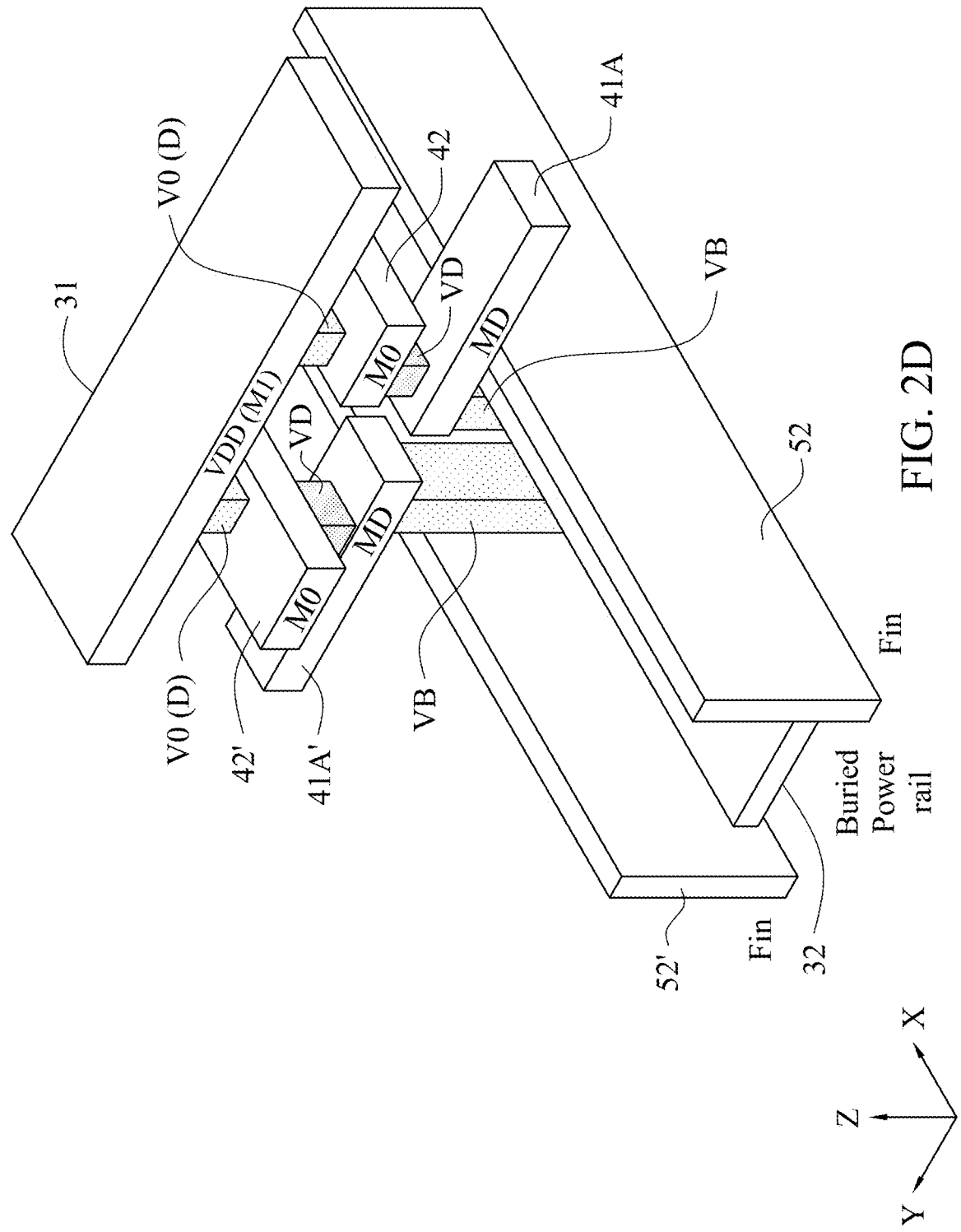
FIG. 2D is a perspective view of some parts of the abutting power pick-up cells, in accordance with some embodiments.

FIG. 2A is a schematic diagram of a section of a layout 100 for an IC circuit, with another arrangement of the power pick-up cells 40, in accordance with some embodiments. In FIG. 2A, some of the power pick-up cells 40 in neighboring rows are abutting each other. FIGS. 2B-2C and FIGS. 2Bx-2Cx are plan views and corresponding cross-sectional views of some parts of the abutting power pick-up cells 40 within the area identified by the circular 40X in FIG. 2A, in accordance with some embodiments. FIG. 2D is a perspective view of some parts of the abutting power pick-up cells 40 within the area identified by the circular 40X, in accordance with some embodiments.

In FIG. 2B, the layout of some parts of the abutting power pick-up cells 40 in the layers between the second metal layer M1 and the first metal layer M0 are shown in a plan view. FIG. 2Bx is a cross-sectional view of the structure in FIG. 2B along line P-P'. In FIG. 2C, the layout of some parts of the abutting power pick-up cells 40 in the layers between the first metal layer M0 and the bottom layer of the buried power rails (e.g., 32 and 34) are shown in a plan view. FIG. 2Cx is a cross-sectional view of the structure in FIG. 2C along line P-P'. As shown in FIG. 2Bx and FIG. 2D, the first upper power rail 31 in the second metal layer M1 is conductively connected to the first power pads 42 and 42' through vias V0(D) between the second metal layer M1 and the first metal layer M0. As shown in FIG. 2Cx and FIG. 2D, the first power pads 42 and 42' are conductively connected to the conductive segments 41A and 41A' through vias VD, and the conductive segments 41A and 41A' are conductively connected to the first buried power rail 32 through vias VB.

In FIG. 1A and FIG. 2A, each of the standard cells (e.g., 102A, 102B, 102C, 102D, 102E, or 102F) for building a functional circuit has a height and a width. The standard cell 102E has a height "h" and a width "w." In some embodiments, the standard cells have substantially uniform height, and a height of a standard cell is related to the separation distance between the first buried power rail 32 and the second buried power rail 34. In some embodiments, the height of a standard cell is designed to be equal to a vertical distance between the middle line of the first buried power rail 32 extending in the X-direction and the middle line of the second buried power rail 34 extending in the X-direction. Generally in at least one embodiment, each of the standard cells has a width that depends upon its type or its function. In some embodiments, one type of standard cell has a width different from a width of another type of standard cell.

Figure 3:
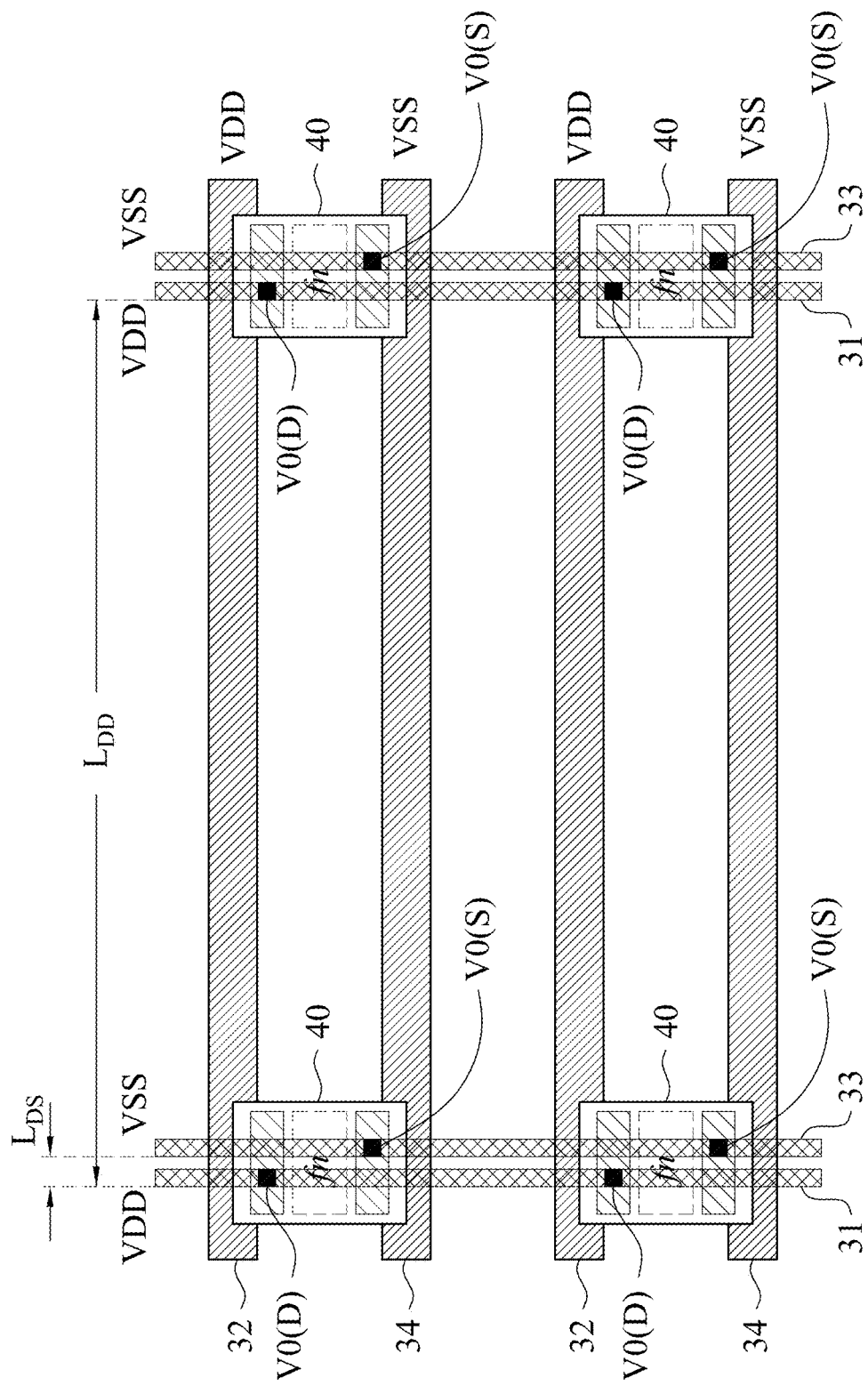
FIG. 3 is a schematic diagram of a section of a layout that includes power pick-up cells implemented with additional functions, in accordance with some embodiments.

While the horizontal position of a standard cell in a selected row is changeable according to design needs, the boundary of the standard cells in at least some embodiments does not touch the boundary of any of the power pick-up cells 40. In at least some embodiments and according to some implementations of the design rules, the areas occupied by the power pick-up cells 40 in a layout diagram are considered forbidden zones for the purpose of placing standard cells. A forbidden zone is an area in a layout design in which standard cells are not allowed to be placed. These forbidden zones reduce the total layout area usable for placing the standard cells in a functional circuit. The adverse impact of the forbidden zones on the total layout area can be alleviated by decreasing the number of forbidden zones. The adverse impact on the total layout area due to the areas occupied by the power pick-up cells 40 can also be alleviated if some of the power pick-up cells 40 are implemented with useful functions, such as logic operation functions. In FIG. 3, the power pick-up cells 40 are implemented with additional functions, in addition to their power pick-up role for connecting the upper power rails (e.g., 31 or 33) with the buried power rails (e.g., 32 or 34). These new implementations of the power pick-up cells 40 are labeled with letters "fn", to distinguish them from the power pick-up cells 40 in FIG. 1A and FIG. 2A. As in FIG. 1A and FIG. 2A, the standard cells in FIG. 3 are also placed in rows, for building a functional circuit, but examples of these standard cells (e.g., 102A, 102B, 102C, 102D, 102E, and 102F) are not explicitly shown in FIG. 3.

Figure 4B:
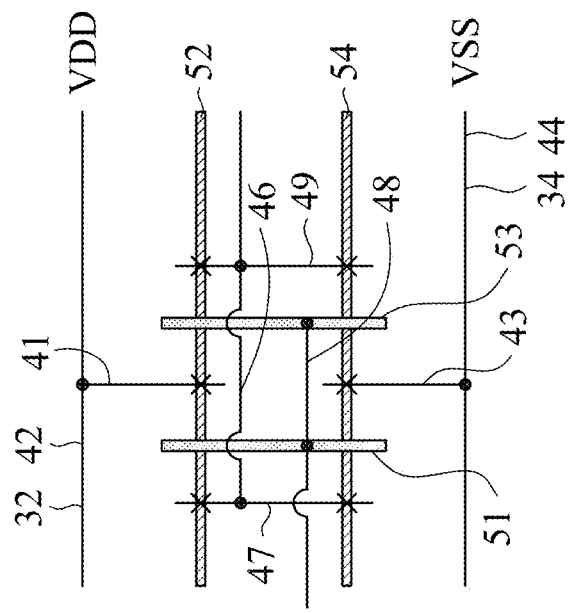
FIGS. 4A-4D are schematic diagrams of a power pick-up cell that has the logic function of an inverter, in accordance with some embodiments.
Figure 4A:
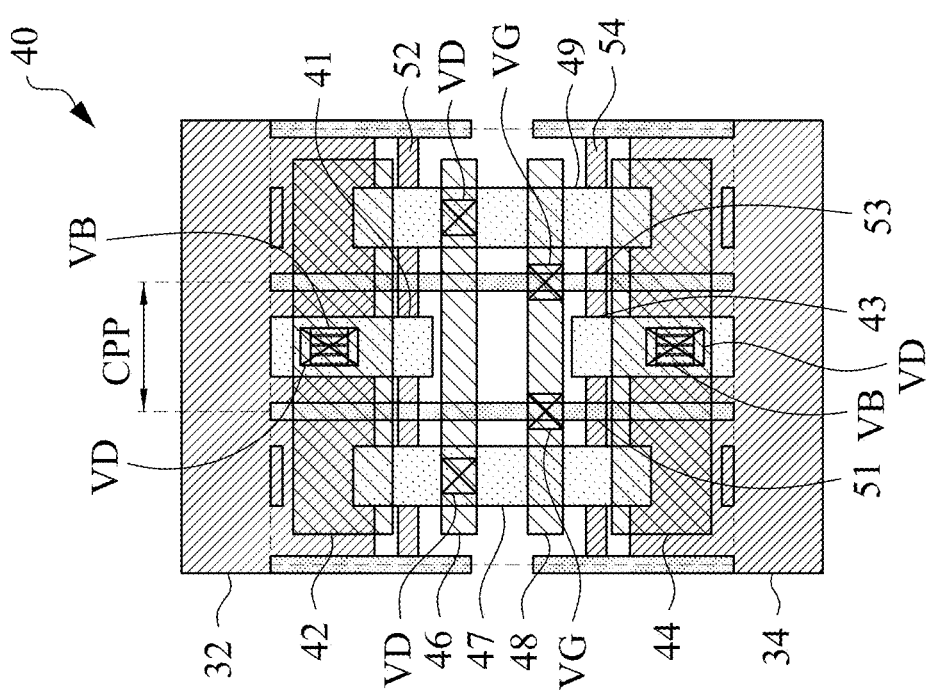
Figure 4D:
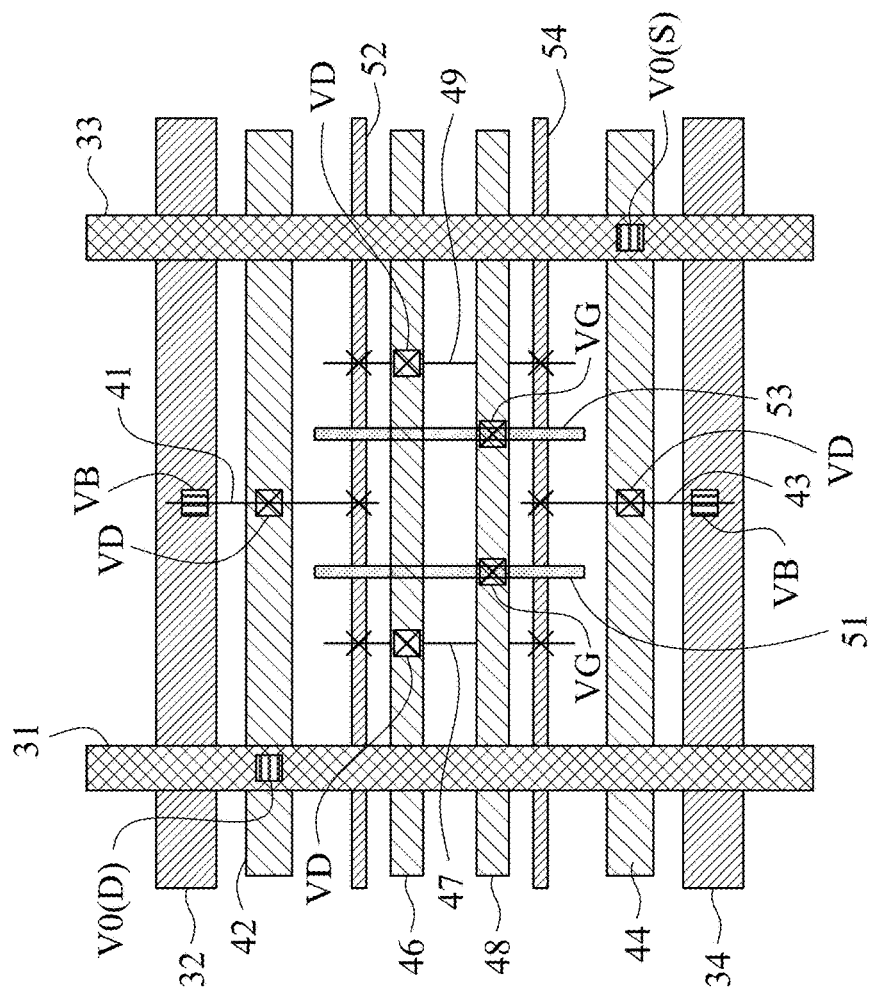
Figure 4C:
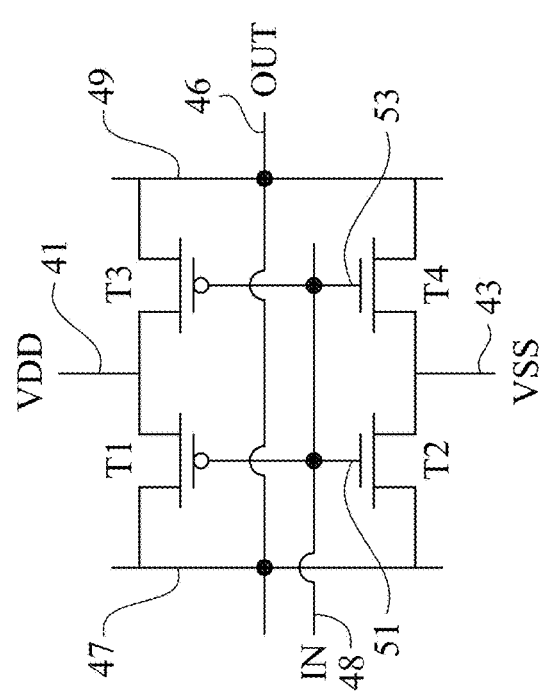

FIGS. 4A-4D are schematic diagrams of a power pick-up cell 40 that has the logic function of an inverter, in accordance with some embodiments. FIG. 4A shows a layout of the power pick-up cell 40. FIG. 4B is a stick diagram of the inverter in the layout of FIG. 4A. FIG. 4C is the circuit diagram of the inverter in FIG. 4B. Each of the conductive segments in the conductive layer MD (e.g., 41, 43, 47, and 49) extending in the Y-direction, as shown in the layout diagram of FIG. 4A, is represented by a vertical line in the stick diagram of FIG. 4B. Each of the gate-strips (e.g., 51 and 53) extending in the Y-direction, as shown in FIG. 4A, is represented by a vertical stick with the same shading pattern in FIG. 4B. Each of the two active zones (e.g., 52 and 54) extending in the X-direction, as shown in FIG. 4A, is represented by a horizontal vertical stick with the same shading pattern in FIG. 4B. Each of the two horizontal conducting tracks (e.g., 46 and 48) extending in the X-direction, as shown in FIG. 4A, is represented by a horizontal line in FIG. 4B. The buried power rail 32 and the power pad 42 extending in the X-direction, as shown in FIG. 4A, are collectively represented by a horizontal line VDD in FIG. 4B. The buried power rail 34 and the power pad 44 extending in the X-direction, as shown in FIG. 4A, are collectively represented by a horizontal line VSS in FIG. 4B.

In FIG. 4B, each cross-point between a gate-strip (e.g., 51 or 53) and an active zone (e.g., 52 or 54) represents a gate of a transistor. Each cross-point (marked with "x") between a conductive segment (e.g., 41, 43, 47, or 49) and an active zone (e.g., 52 or 54) represents a source/drain of a transistor. For example, the cross-point between the gate-strips 51 and the active zone 52 represents the gate of a transistor T1. The cross-point between the conductive segment 47 and the active zone 52 represents the drain of the transistor T1. The cross-point between the conductive segment 41 and the active zone 52 represents the source of the transistor T1.

In FIG. 4B, the cross-point connection (marked with a dot) between the horizontal line 48 and a gate-strip (e.g., 51 or 53) represents a via VG. The cross-point connection (marked with a dot) between the horizontal line 46 and a conductive segment (e.g., 47 or 49) represents a via VD. The cross-point connection (marked with a dot) between conductive segment 41 and the horizontal line 42 represents a via VD while the same dot at the cross-point connection between conductive segment 41 and the horizontal line 32 also represents a via VB. Similarly, the cross-point connection (marked with a dot) between conductive segment 43 and the horizontal line 44 represents a via VD while the same dot at the cross-point connection between conductive segment 43 and the horizontal line 34 also represents a via VB.

In FIGS. 4A-4C, the inverter in the power pick-up cell 40 includes the p-channel transistor T1 and the p-channel transistor T3 formed in the p-channel active zone 52, with the gate of transistor T1 formed by the gate-strip 51 and the gate of transistor T3 formed by the gate-strip 53. The inverter includes the n-channel transistor T2 and the n-channel transistor T4 formed in the n-channel active zone 54, with the gate of transistor T2 formed by the gate-strip 51 and the gate of transistor T4 formed by the gate-strip 53. The supply voltages for the inverter VDD and VSS are correspondingly provided by the first buried power rail 32 and the second buried power rail 34. The drain of the p-channel transistor T1 and the drain of the n-channel transistor T2 are conductively connected with each other through a conductive segment 47 in the conductive layer MD. The drain of the p-channel transistor T3 and the drain of the n-channel transistor T4 are conductively connected with each other through a conductive segment 49 in the conductive layer MD. The input signal to the inverter is conducted to the gate-strips 51 and 53 through a horizontal conducting track 48. The output signal of the inverter is on the horizontal conducting track 46.

FIG. 4D is a modified stick diagram of the conductive connections between the upper power rails (e.g., 31 or 33), the power pads (e.g., 42 or 44), and the buried power rails (e.g., 32 or 34), in accordance with some embodiments. Similar to the stick diagram in FIG. 4B, the modified stick diagram in FIG. 4D illustrates topological connections among different conductive elements. The widths and geometric locations of the conductive elements in FIG. 4D do not track exactly with the real widths and real geometric locations of those elements in a physical layout diagram (such as the diagram in FIG. 4A). In the power pick-up cell 40 as shown in FIG. 4A and FIG. 4D, the first upper power rail 31 is conductively connected to the first power pad 42 through the via V0(D), the first power pad 42 is conductively connected to the conductive segment 41 in the conductive layer MD through the via VD, and the conductive segment 41 is conductively connected to the first buried power rail 32 through the via VB. Similarly, in FIG. 4A and FIG. 4D, the second upper power rail 33 is conductively connected to the second power pad 44 through the via V0(S), the second power pad 44 is conductively connected to the conductive segment 43 in the conductive layer MD through the via VD, and the conductive segment 43 is conductively connected to the second buried power rail 34 through the via VB. With the power pick-up cell 40, the first upper power rail 31 is conductively connected to the first buried power rail 32, and the second upper power rail 33 is conductively connected to the second buried power rail 34.

In FIGS. 4A-4D, each of the active zones 52 and 54 is continuous. In other embodiments, either of the active zones 52 and 54 include multiple segments of active zones; in these embodiments, the transistor T1 is on one segment while the transistor T3 is on another segment of the p-channel active zone 52, and the transistor T2 is on one segment while the transistor T4 is on another segment of the n-channel active zone 54. In some embodiments, the active zones 52 and 54 are specified in one logic layer, such as an Oxide Diffusion ("OD") layer in a layout design. During fabrication according to at least one embodiment, the formation of the active zones 52 and 54 involves one or more physical masks for oxidation process and diffusion process. Additionally, in FIGS. 4A-4D, each of the gate-strips 51 and 53 are a poly strip or a metal gate strip.

Figure 5B:
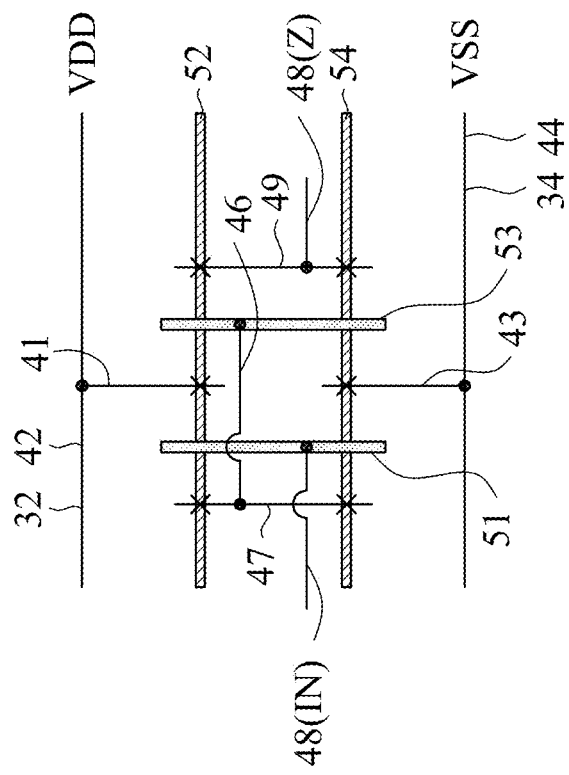
FIGS. 5A-5D are schematic diagrams of a power pick-up cell that has the logic function of a buffer, in accordance with some embodiments.
Figure 5A:
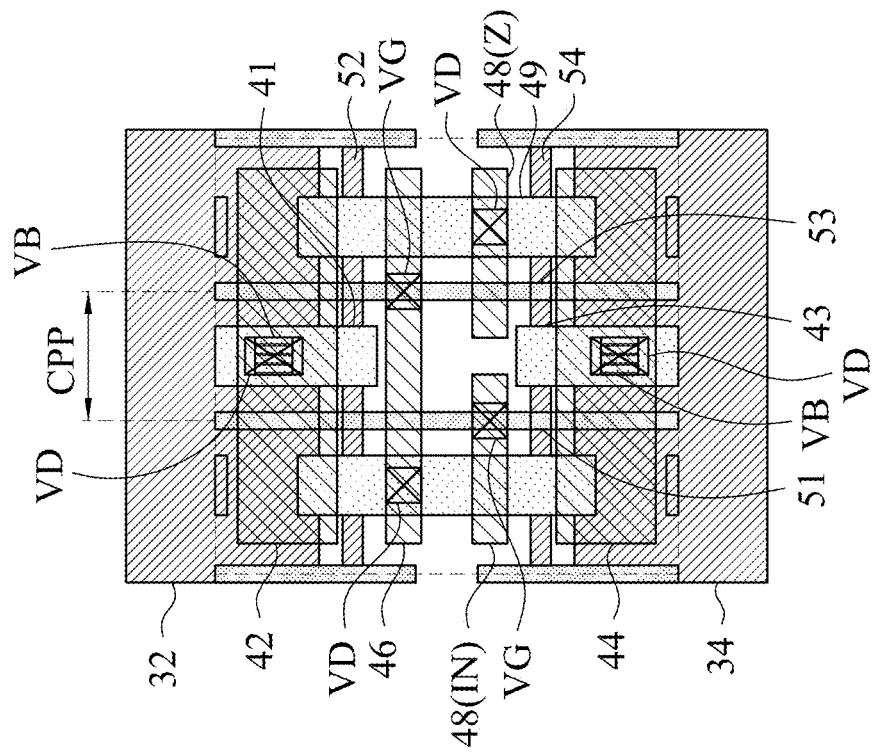
Figure 5D:
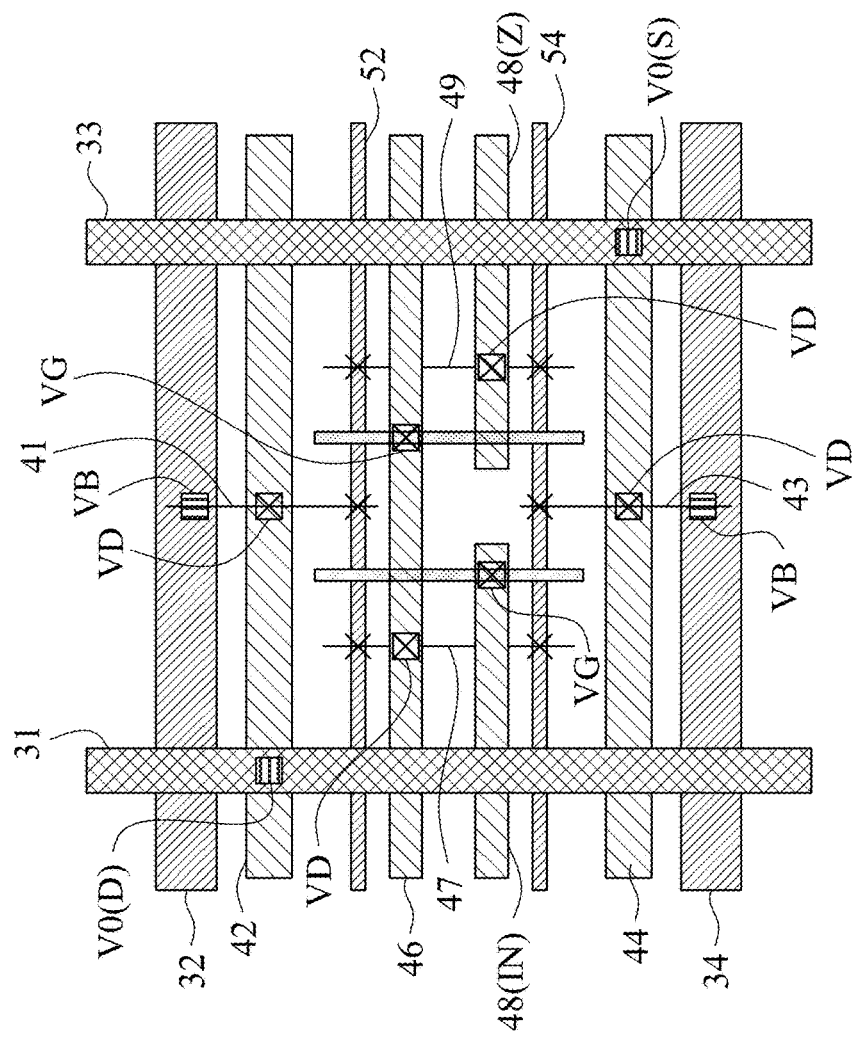
Figure 5C:
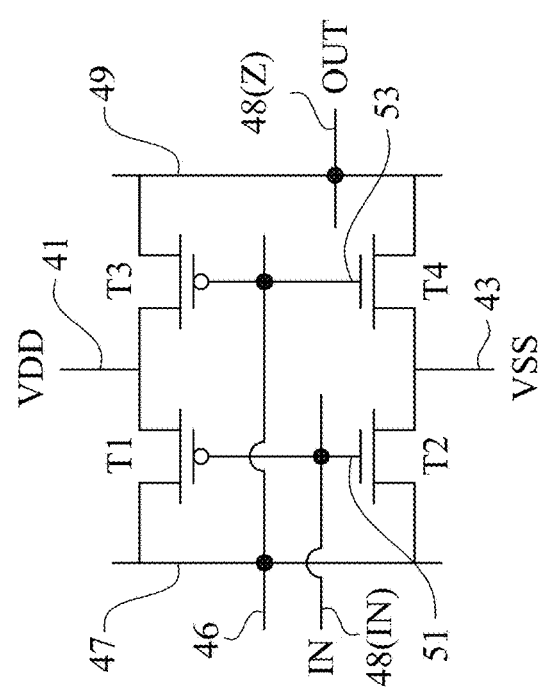

FIGS. 5A-5D are schematics diagrams of a power pick-up cell that has the logic function of a buffer, in accordance with some embodiments. FIG. 5A shows a layout of the power pick-up cell 40. FIG. 5B is a stick diagram of the buffer in the layout of FIG. 5A. FIG. 5C is a circuit diagram of the buffer in FIG. 5B. As shown in FIGS. 5A-5C, the buffer in the power pick-up cell 40 includes the p-channel transistor T1 and the p-channel transistor T3 formed in the p-channel active zone 52, with the gate of transistor T1 formed by the gate-strip 51 and the gate of transistor T3 formed by the gate-strip 53. The buffer includes the n-channel transistor T2 and the n-channel transistor T4 formed in the n-channel active zone 54, with the gate of transistor T2 formed by the gate-strip 51 and the gate of transistor T4 formed by the gate-strip 53. The supply voltages VDD and VSS for the buffer are correspondingly provided by the first buried power rail 32 and the second buried power rail 34. The drain of the p-channel transistor T1 and the drain of the n-channel transistor T2 are conductively connected with each other through a conductive segment 47 in the conductive layer MD. The drain of the p-channel transistor T3 and the drain of the n-channel transistor T4 are conductively connected with each other through a conductive segment 49 in the conductive layer MD. The conductive segment 47 is conductively connected to the gate-strip 53 through the horizontal conducting track 46. The input signal to the buffer is conducted to the gate-strip 51 through the horizontal conducting track 48(IN). The output signal of the buffer is on the horizontal conducting track 48(Z).

FIG. 5D is a modified stick diagram of the conductive connections between the upper power rails (e.g., 31 or 33), the power pads (e.g., 42 or 44), and the buried power rails (e.g., 32 or 34), in accordance with some embodiments. Similar to the modified stick diagram in FIG. 4D, the first upper power rail 31 is conductively connected to the first power pad 42 through the via V0(D), and the first power pad 42 is conductively connected to the conductive segment 41 (through the via VD) that is conductively connected to the first buried power rail 32 through the via VB; the second upper power rail 33 is conductively connected to the second power pad 44 through the via V0(S), and the second power pad 44 is conductively connected to the conductive segment 43 (through the via VD) that is conductively connected to the second buried power rail 34 through the via VB. With the power pick-up cell 40, the first upper power rail 31 is conductively connected to the first buried power rail 32, and the second upper power rail 33 is conductively connected to the second buried power rail 34.

Figure 6:
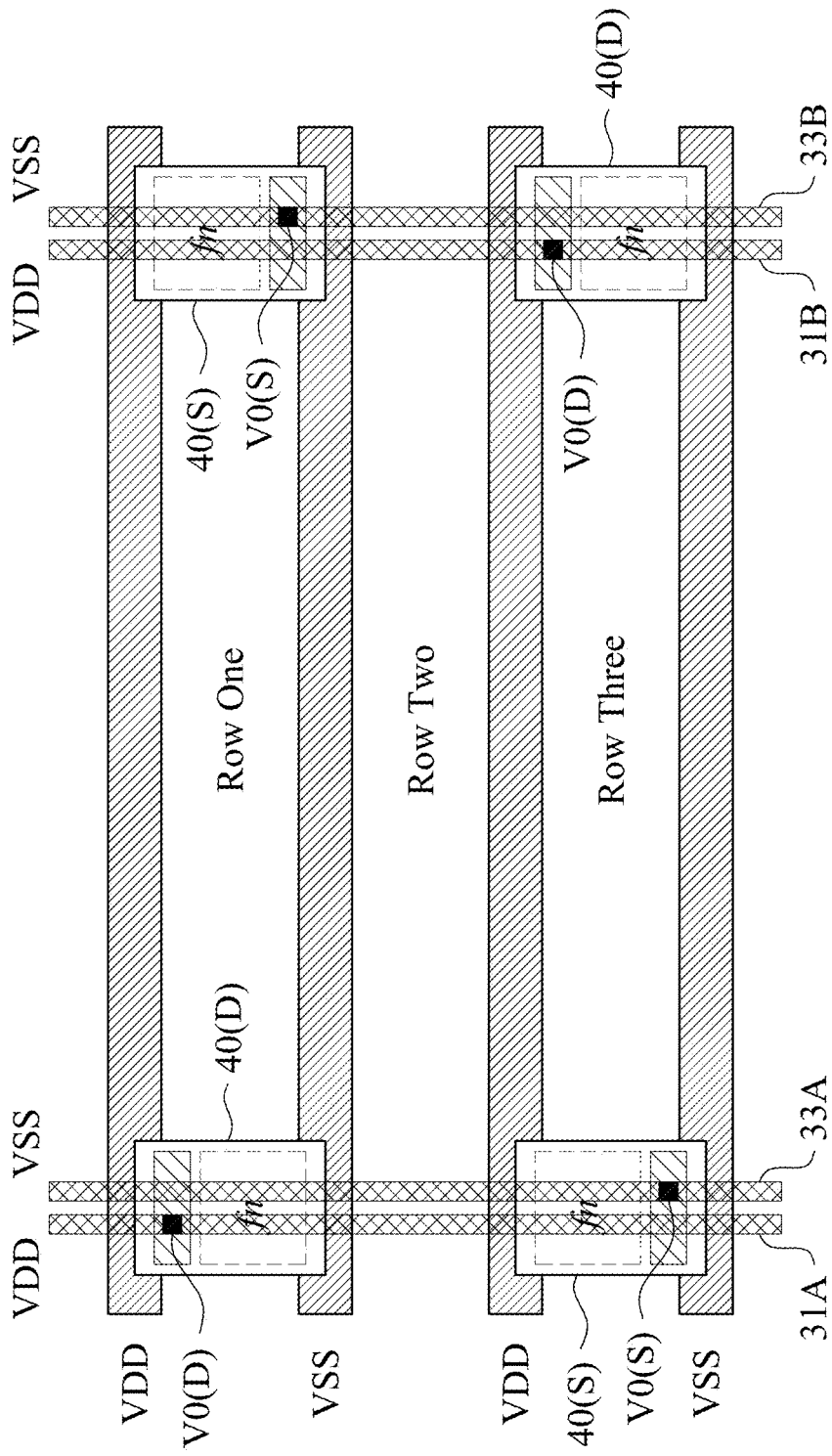
FIG. 6 is a schematic diagram of a section of a layout that includes power pick-up cells implemented with additional functions, in accordance with some embodiments.

FIG. 6 is a schematic diagram a section of a layout 100 for an IC circuit that includes power pick-up cells implemented with logical or other functions, in accordance with some embodiments. In FIG. 6, power pick-up cells 40(D) conductively connect the first upper power rail 31 to the first buried power rail 32, and power pick-up cells 40(S) conductively connect the second upper power rail 33 to the second buried power rail 34. While the power pick-up cell 40 as shown in FIG. 3 has two power pads, in some embodiments, at least some of the power pick-up cells 40 do not have to have two power pads. In some embodiments, at least some of the power pick-up cells 40 have greater or lesser numbers of power pads. The power pick-up cell 40(D) is used for connecting the first upper power rail 31A to the first buried power rail 32 in row one and for connecting the first upper power rail 31B to the first buried power rail 32 in row three; the power pick-up cell 40(S) is used for connecting the second upper power rail 33A to the second buried power rail 34 in row three and for connecting the second upper power rail 33B to the second buried power rail 34 in row one. The power pick-up cell 40(D) is implemented with the first power pad having the first supply voltage VDD, and the power pick-up cell 40(S) is implemented with the second power pad having the second supply voltage VSS. FIGS. 7A-7D provide an example embodiment of the power pick-up cell 40(S), and FIGS. 8A-8D provide an example embodiment of the power pick-up cell 40(D).

Figure 7B:
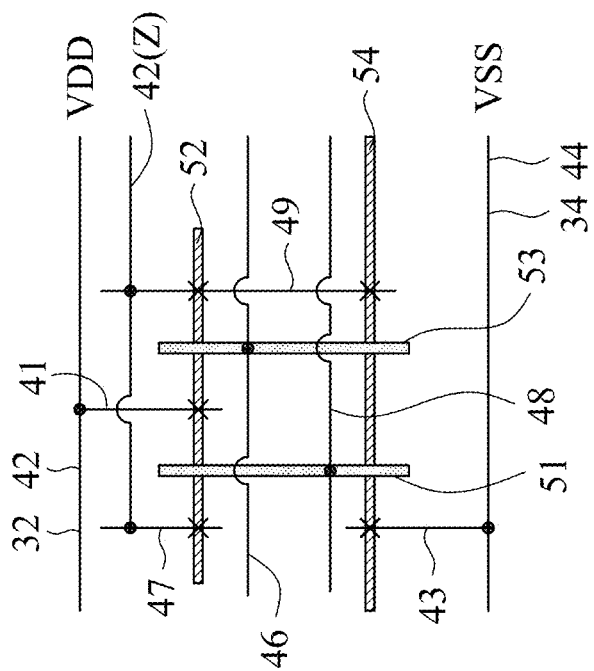
FIGS. 7A-7D are schematic diagrams of a power pick-up cell that has the logic function of a NAND gate, in accordance with some embodiments.
Figure 7A:
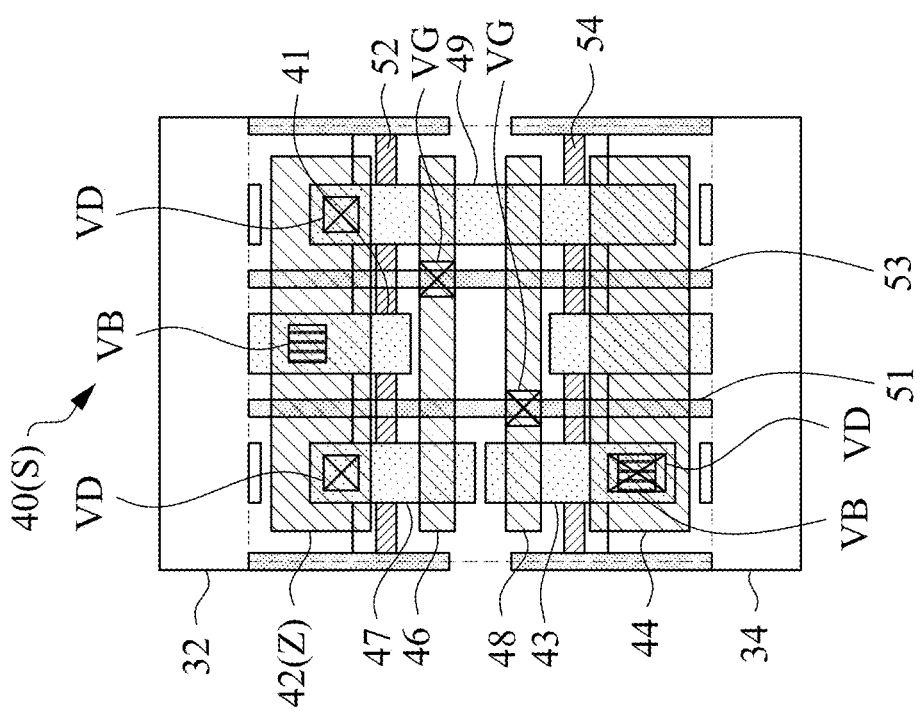
Figure 7D:
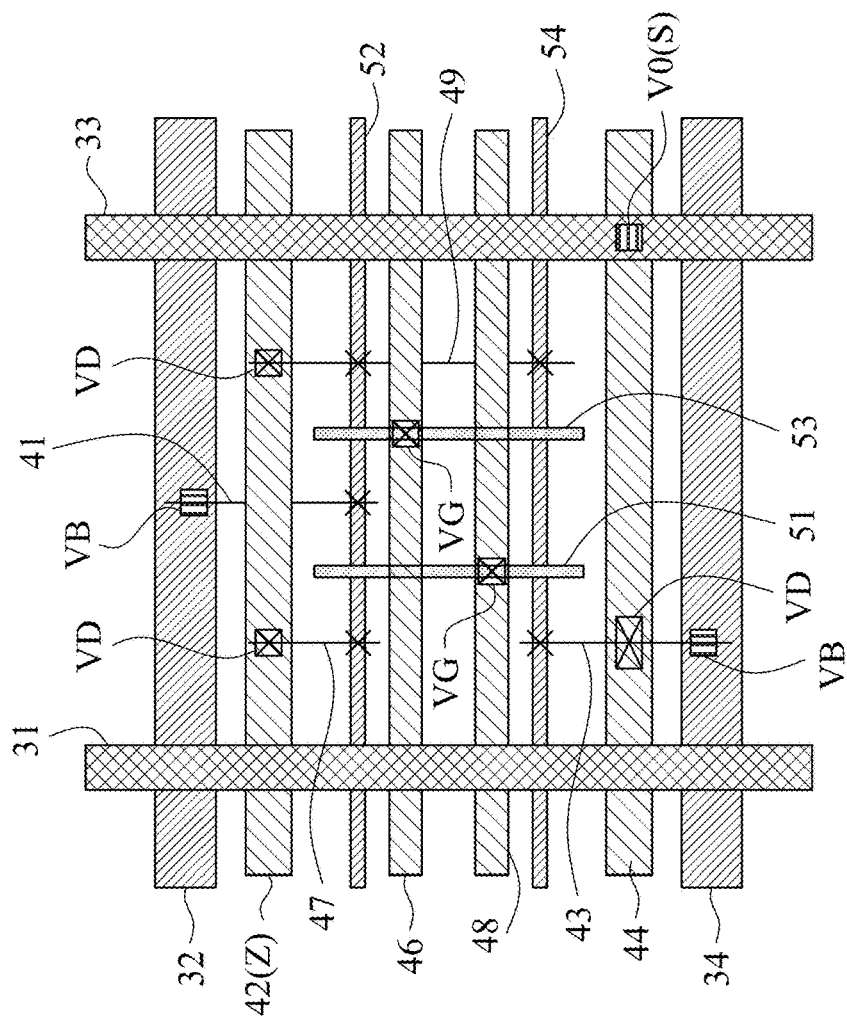
Figure 7C:
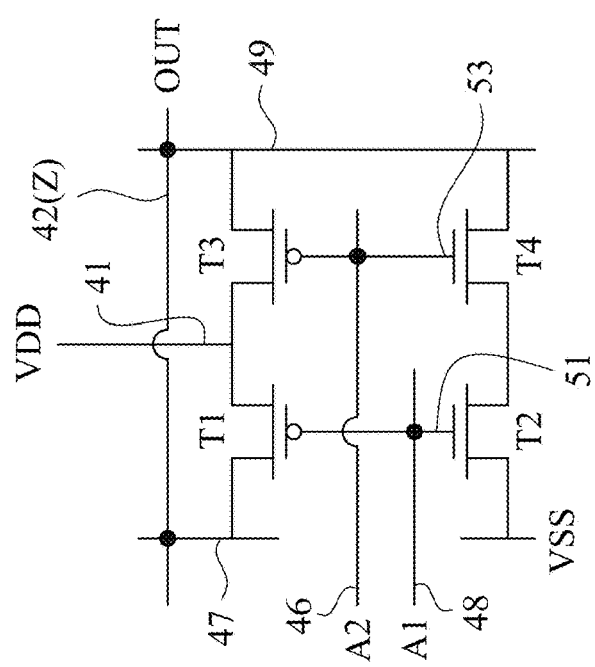

FIGS. 7A-7D are schematic diagrams of a power pick-up cell 40(S) having the logic function of a NAND gate, in accordance with some embodiments. FIG. 7A shows a layout of the power pick-up cell 40(S). FIG. 7B is a stick diagram of the NAND gate in the layout of FIG. 7A. FIG. 7C is the circuit diagram of the NAND gate in FIG. 7B. As shown in FIGS. 7A-7C, the NAND gate includes the p-channel transistor T1 and the p-channel transistor T3 formed in the p-channel active zone 52, with the gate of transistor T1 formed by the gate-strip 51 and the gate of transistor T3 formed by the gate-strip 53. The NAND gate includes the n-channel transistor T2 and the n-channel transistor T4 in the n-channel active zone 54, with the gate of transistor T2 formed by the gate-strip 51 and the gate of transistor T4 formed by the gate-strip 53. The supply voltages VDD and VSS for the NAND gate are correspondingly provided by the first buried power rail 32 and the second buried power rail 34. The drain of the p-channel transistor T1 and the drain of the p-channel transistor T3 are conductively connected with each other through a horizontal conducting track 42(Z). The drain of the p-channel transistor T3 and the drain of the n-channel transistor T4 are conductively connected with each other through a conductive segment 49 in the conductive layer MD. The drain of the n-channel transistor T2 is conductively connected with the source of the n-channel transistor T4. The source of the n-channel transistor T2 is conductively connected to the power pad 44 through a conductive segment 43 in the conductive layer MD. The first input signal to the NAND gate is conducted to the gate-strip 51 through the horizontal conducting track 48. The second input signal to the NAND gate is conducted to the gate-strip 53 through the horizontal conducting track 46. The output signal of the NAND gate appears on the horizontal conducting track 42(Z).

In the modified stick diagram of FIG. 7D, the second upper power rail 33 is conductively connected to the second power pad 44 through the via V0(S), the second power pad 44 is conductively connected to the conductive segment 43 through the via VD, and the conductive segment 43 is conductively connected to the second buried power rail 34 through the via VB. With the power pick-up cell 40(S), the second upper power rail 33 is conductively connected to the second buried power rail 34.

Figure 8B:
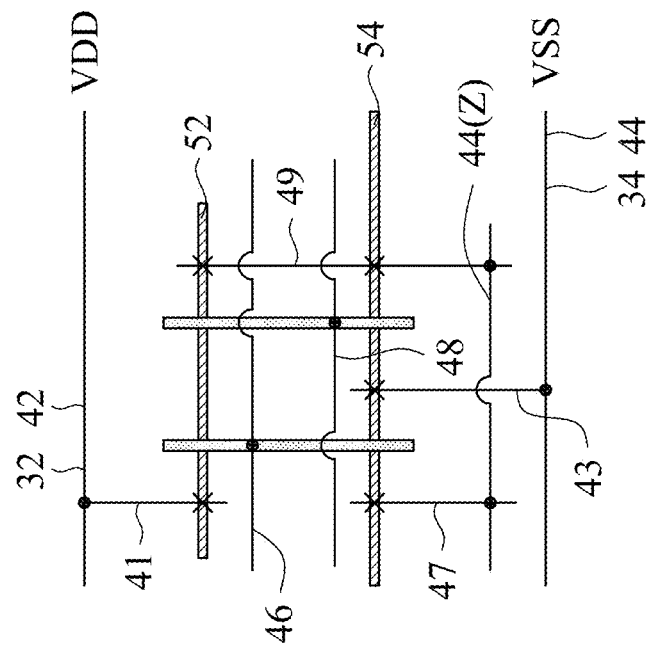
FIGS. 8A-8D are schematic diagrams of a power pick-up cell that has the logic function of a NOR gate, in accordance with some embodiments.
Figure 8A:
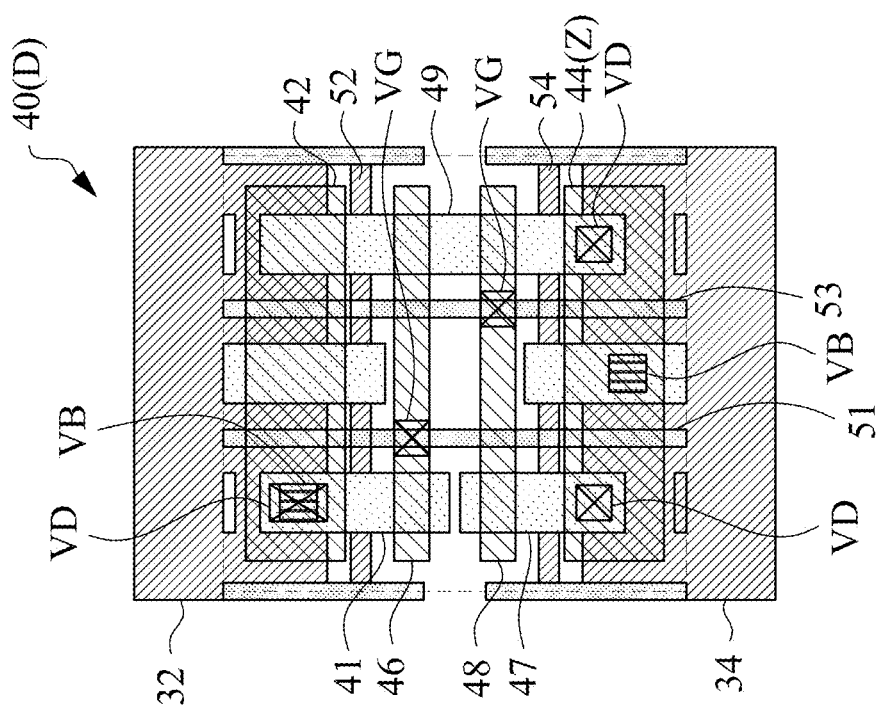
Figure 8D:
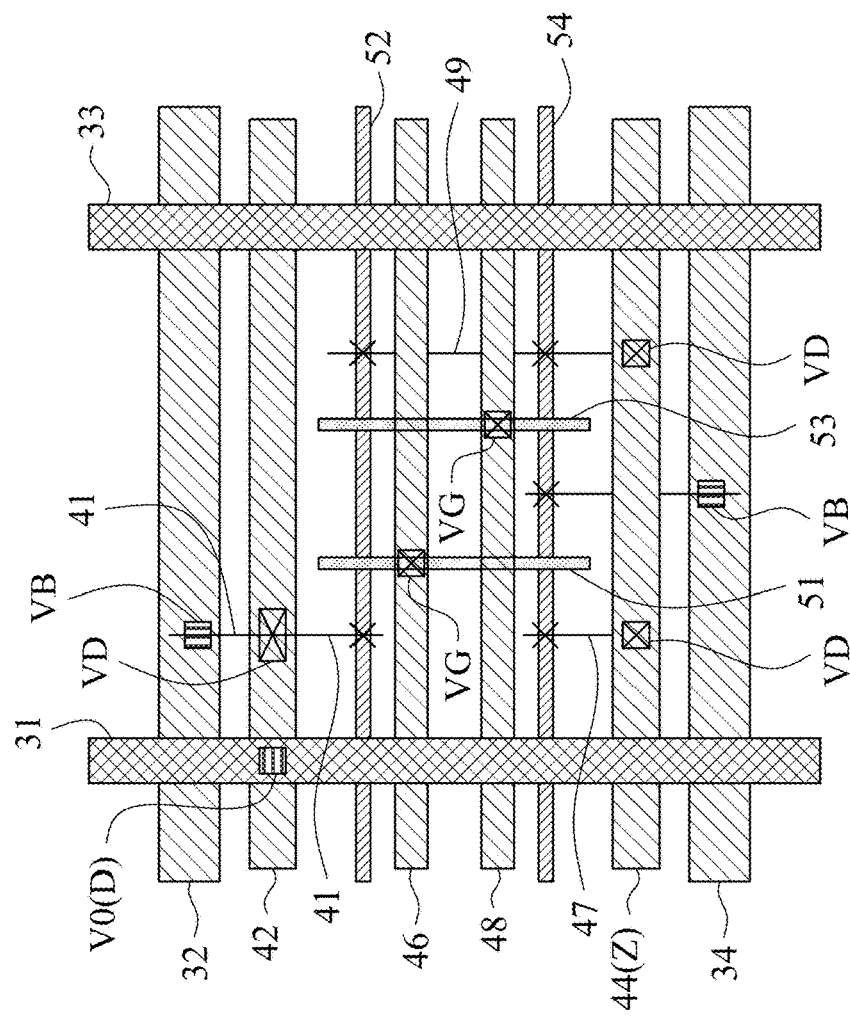
Figure 8C:
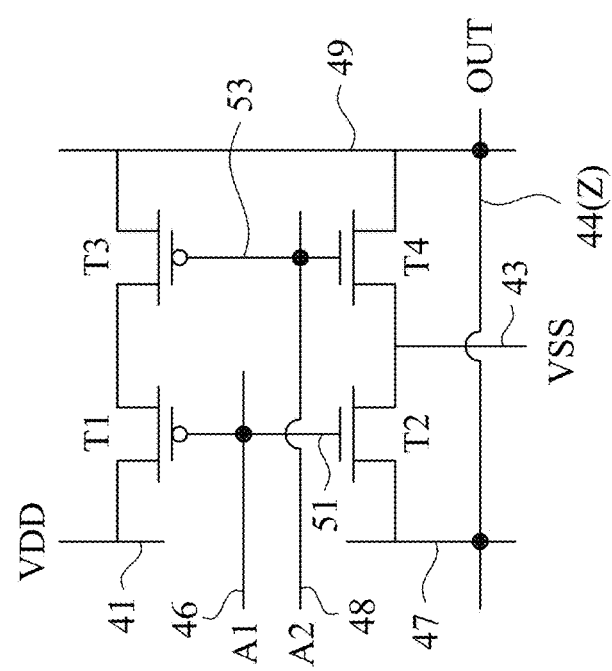

FIGS. 8A-8D are schematic diagrams of a power pick-up cell that has the logic function of a NOR gate, in accordance with some embodiments. FIG. 8A shows a layout of the power pick-up cell 40(D). FIG. 8B is a stick diagram of the NOR gate in the layout of FIG. 8A. FIG. 8C is the circuit diagram of the NOR gate in FIG. 8B. As shown in FIGS. 8A-8C, the NOR gate includes the p-channel transistor T1 and the p-channel transistor T3 in the p-channel active zone 52, with the gate of transistor T1 formed by the gate-strip 51 and the gate of transistor T3 formed by the gate-strip 53. The NOR gate includes the n-channel transistor T2 and the n-channel transistor T4 in the n-channel active zone 54, with the gate of transistor T2 formed by the gate-strip 51 and the gate of transistor T4 formed by the gate-strip 53. The supply voltages VDD and VSS for the NOR gate are correspondingly provided by the first buried power rail 32 and the second buried power rail 34. The drain of the n-channel transistor T2 and the drain of the n-channel transistor T4 are conductively connected with each other through a horizontal conducting track 44(Z). The drain of the n-channel transistor T4 and the drain of the p-channel transistor T3 are conductively connected with each other through a conductive segment 49 in the conductive layer MD. The drain of the p-channel transistor T1 is conductively connected with the source of the p-channel transistor T3. The source of the p-channel transistor T1 is conductively connected to the power pad 42 through a conductive segment 41 in the conductive layer MD. The first input signal to the NOR gate is conducted to the gate-strip 51 through the horizontal conducting track 46. The second input signal to the NOR gate is conducted to the gate-strip 53 through the horizontal conducting track 48. The output signal of the NOR gate is on the horizontal conducting track 44(Z).

In the modified stick diagram of FIG. 8D, the first upper power rail 31 is conductively connected to the first power pad 42 through the via V0(D), the first power pad 42 is conductively connected to the conductive segment 41 through the via VD, and the conductive segment 41 is conductively connected to the first buried power rail 32 through the via VB. With the power pick-up cell 40(D), the first upper power rail 31 is conductively connected to the first buried power rail 32.

Figure 9:
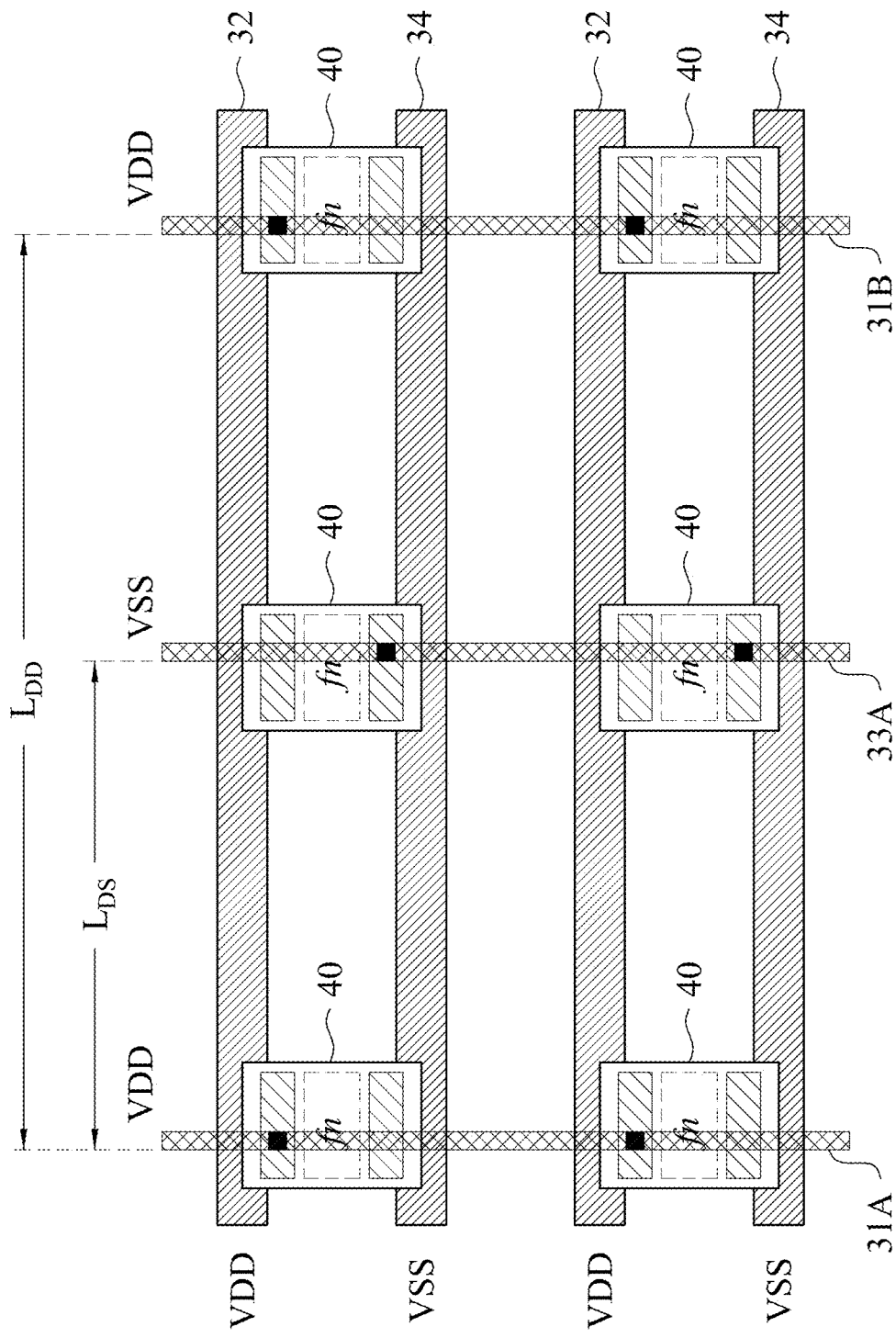
FIG. 9 and FIG. 10 are schematic diagrams each showing a section of a layout that includes power pick-up cells implemented with additional functions, in accordance with some embodiments.
Figure 10:
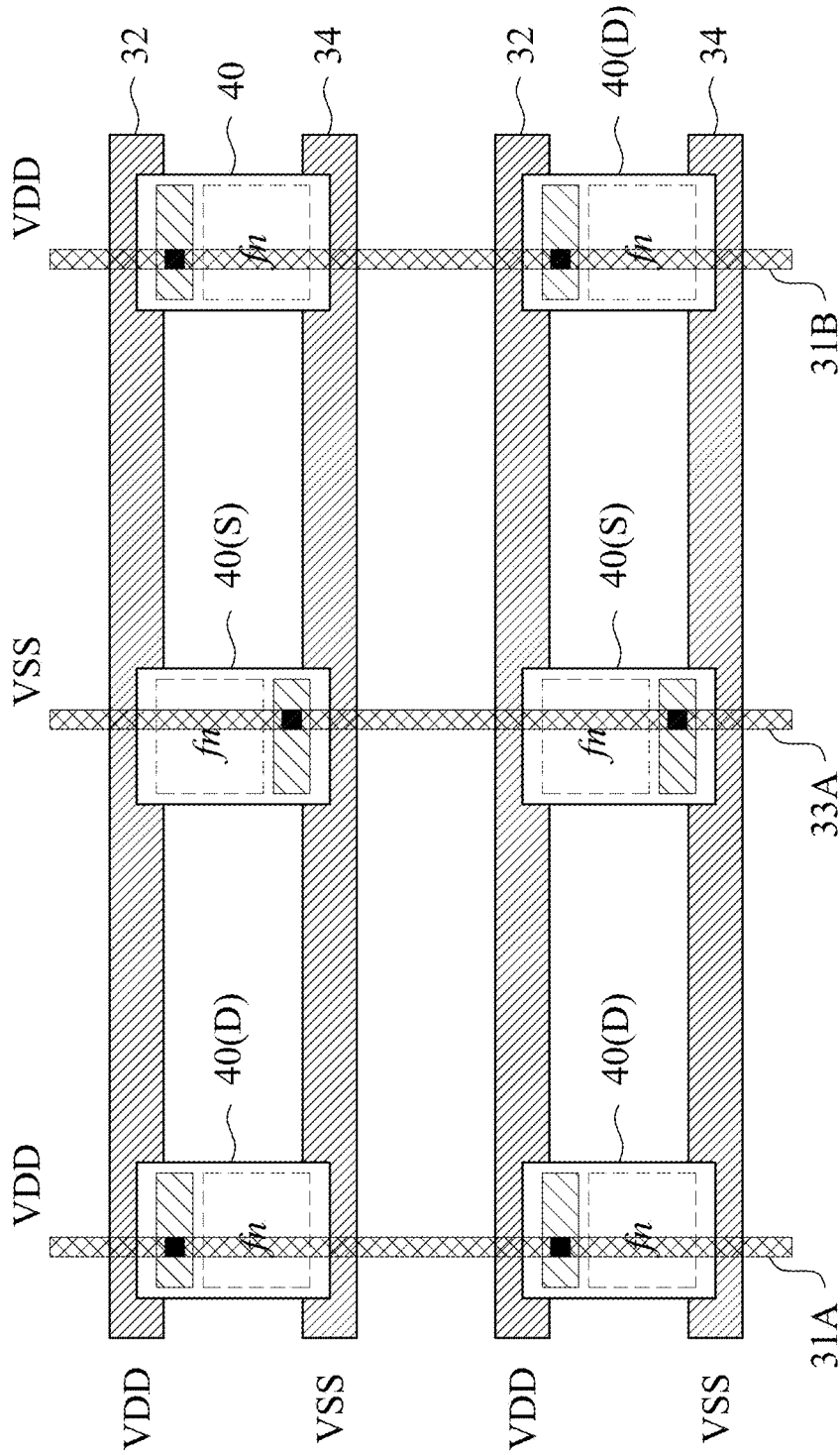

In FIG. 3 and FIG. 6, a first upper power rail 31 and a second upper power rail 33 are positioned close to each other and form an upper power rail pair. In FIG. 9 and FIG. 10, the first upper power rail 31 and second upper power rail 33 are positioned in alternation to form the power rail array, with uniform separation between two neighboring upper power rails.

In the embodiment as shown in FIG. 9, the power pick-up cells 40 implemented with two power pads are used for connecting the first upper power rails (e.g., 31A and 31B) to the first buried power rails 32; the power pick-up cells 40 are also used for connecting the second upper power rails (e.g., 33A) to the second buried power rails 34. In the embodiments as shown in FIG. 10, the power pick-up cells 40(D) implemented with the first power pad are used for connecting the first upper power rails (e.g., 31A and 31B) to the first buried power rails 32; the power pick-up cells 40(S) implemented with the second power pad are used for connecting the second upper power rails (e.g., 33A) to the second buried power rails 34.

In addition to the embodiments of the power pick-up cells as shown in FIGS. 4A-4D, FIGS. 5A-5D, FIGS. 7A-7D, and FIGS. 8A-8D, there are other embodiments of the power pick-up cells.

Figure 11B:
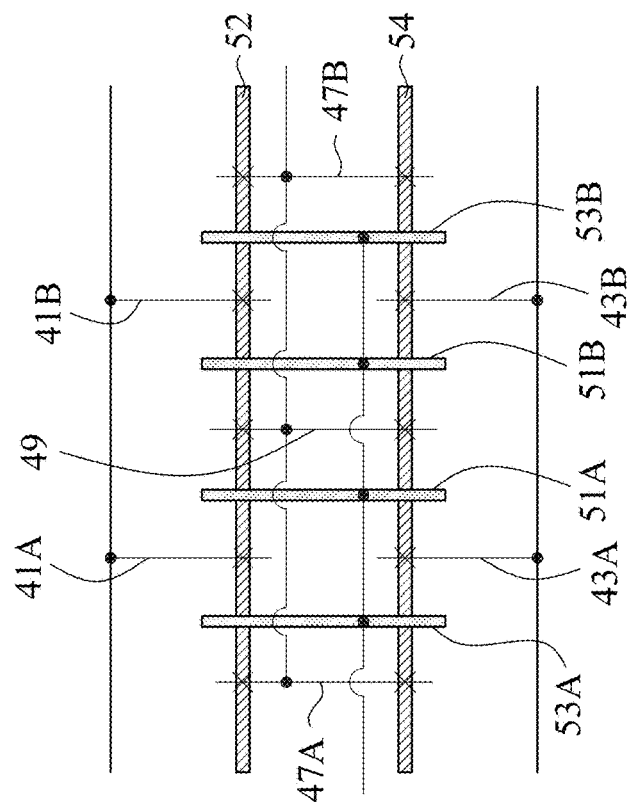
FIGS. 11A-11D are schematic diagrams of a power pick-up cell that has the logic function of an inverter, in accordance with some embodiments.
Figure 11A:
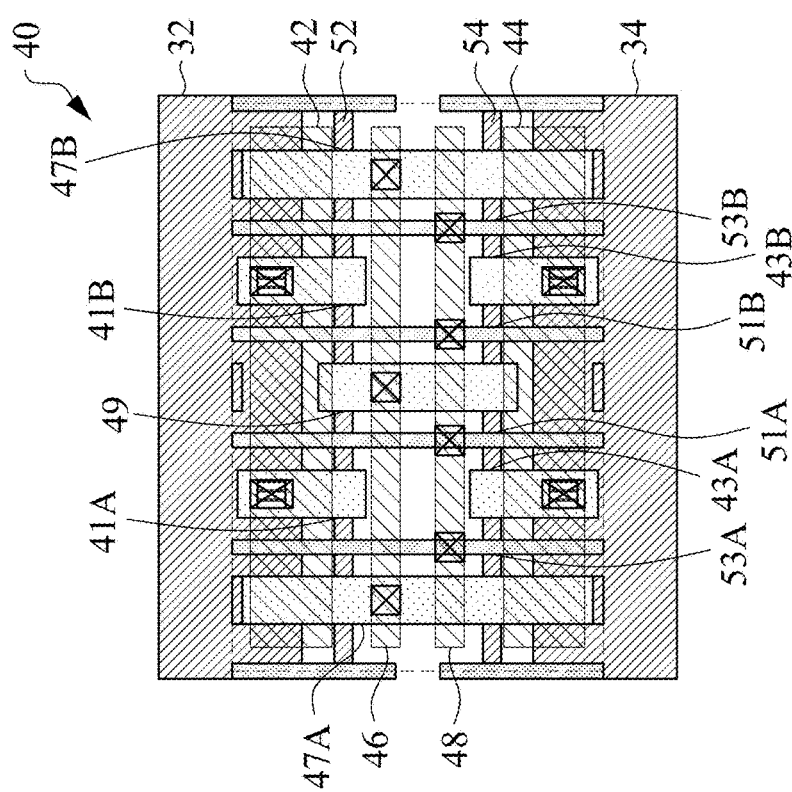
Figure 11D:
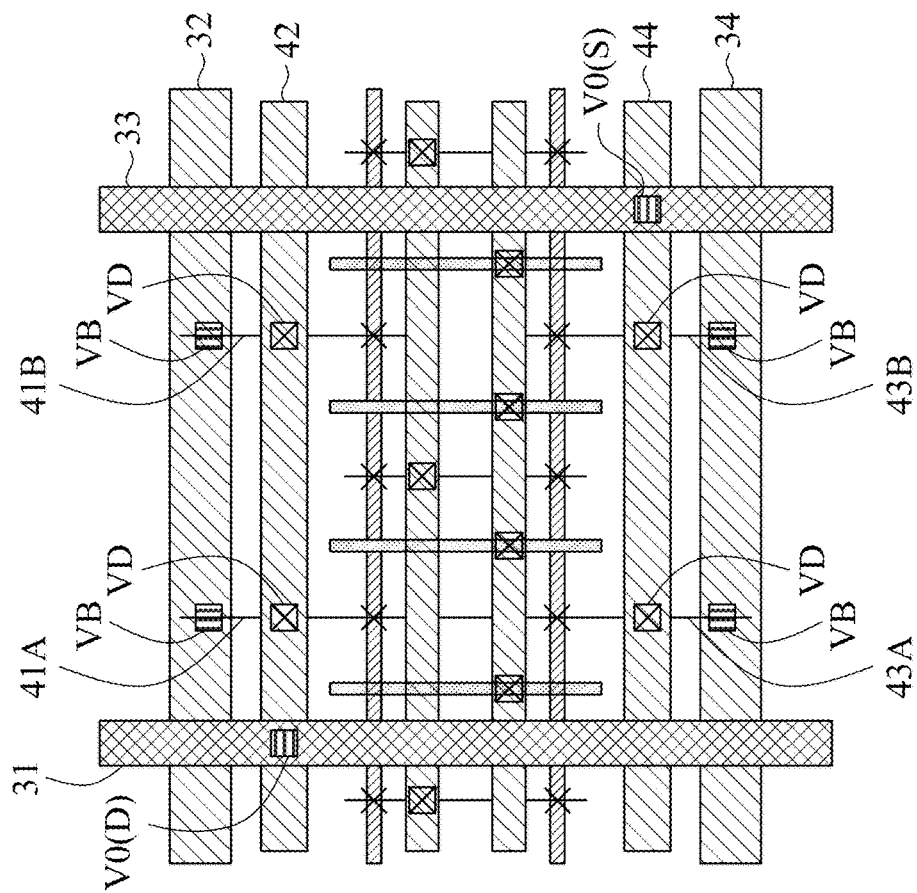
Figure 11C:
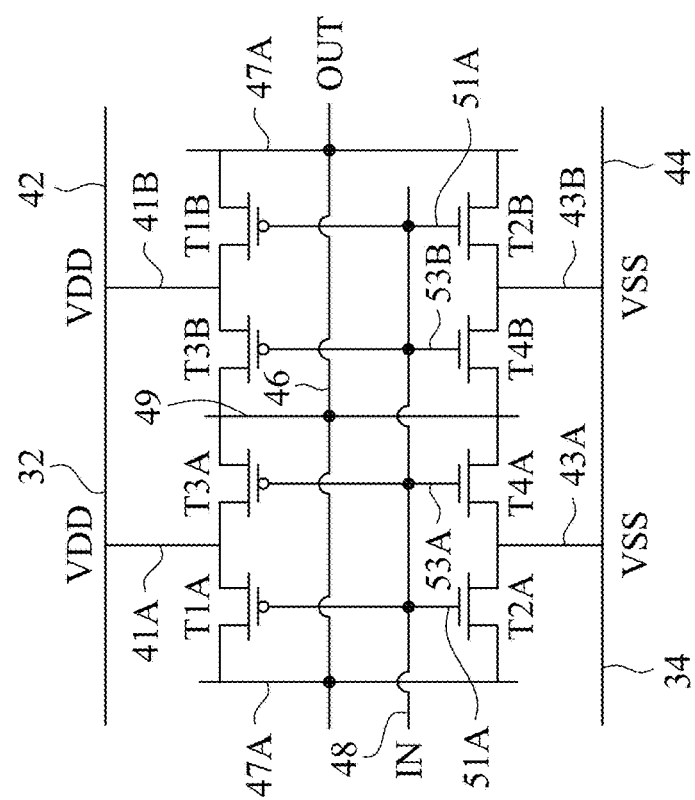

In one embodiment, the power pick-up cell 40 having the first power pad 42 and the second power pad 44 is implemented with the inverter gate as shown in FIGS. 11A-11D. FIG. 11A shows a layout of the power pick-up cell 40. FIG. 11B is a stick diagram of the inverter in the layout of FIG. 11A. FIG. 11C is the circuit diagram of the inverter in FIG. 11B. In FIGS. 11A-11D, the inverter includes the p-channel transistors (e.g., T1A, T1B, T3A, and T3B) in the p-channel active zone 52 and the n-channel transistors (e.g., T2A, T2B, T4A, and T4B) in the n-channel active zone 54. The supply voltages for the inverter VDD and VSS are correspondingly provided by the first buried power rail 32 and the second buried power rail 34. The drain of the p-channel transistors (e.g., T1A, T1B, T3A, and T3B) and the drain of the n-channel transistors (e.g., T2A, T2B, T4A, and T4B) are conductively connected with each other through the conductive segments (e.g., 47A, 47B, and 49) in the MD layer. The input signal to the inverter is conducted to the gate-strips (51A, 51B, 53A, and 53B) through the horizontal conducting track 48. The output signal of the inverter is on the horizontal conducting track 46.

In the power pick-up cell 40 as shown in FIG. 11A and FIG. 11D, the first upper power rail 31 is conductively connected to the first power pad 42 through the via V0(D), and the second upper power rail 33 is conductively connected to the second power pad 44 through the via V0(S). The first power pad 42 is conductively connected to the conductive segments (e.g., 41A and 41B) that are conductively connected to the first buried power rail 32 through the vias VB. The second power pad 44 is conductively connected to the conductive segments (e.g., 43A and 43B) that are conductively connected to the second buried power rail 34 through the vias VB. With the power pick-up cell 40, the first upper power rail 31 is conductively connected to the first buried power rail 32, and the second upper power rail 33 is conductively connected to the second buried power rail 34.

Figure 12:
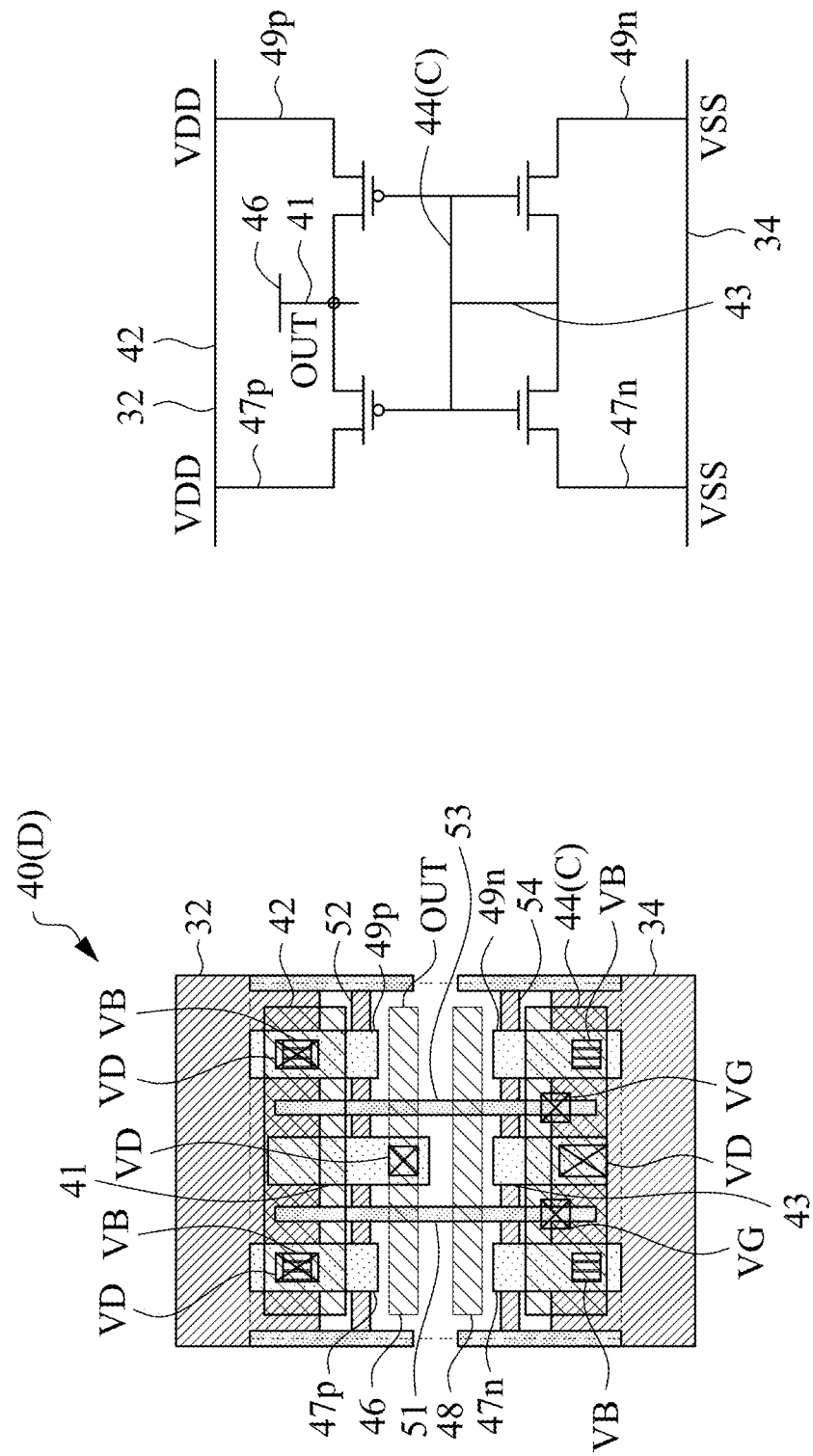
FIG. 12 is a schematic diagram of a power pick-up cell that has the logic function of the tie-high circuit, in accordance with some embodiments.
Figure 13:
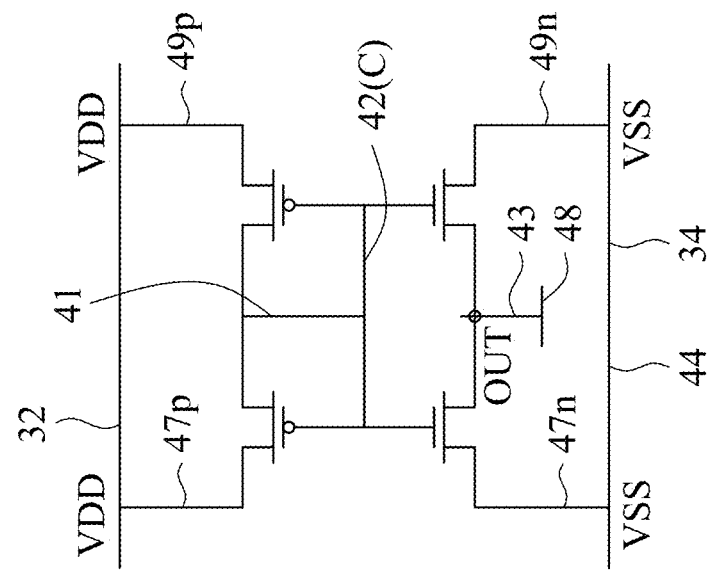
FIG. 13 is a schematic diagram of a power pick-up cell that has the logic function of the tie-low circuit, in accordance with some embodiments.
Figure 13:
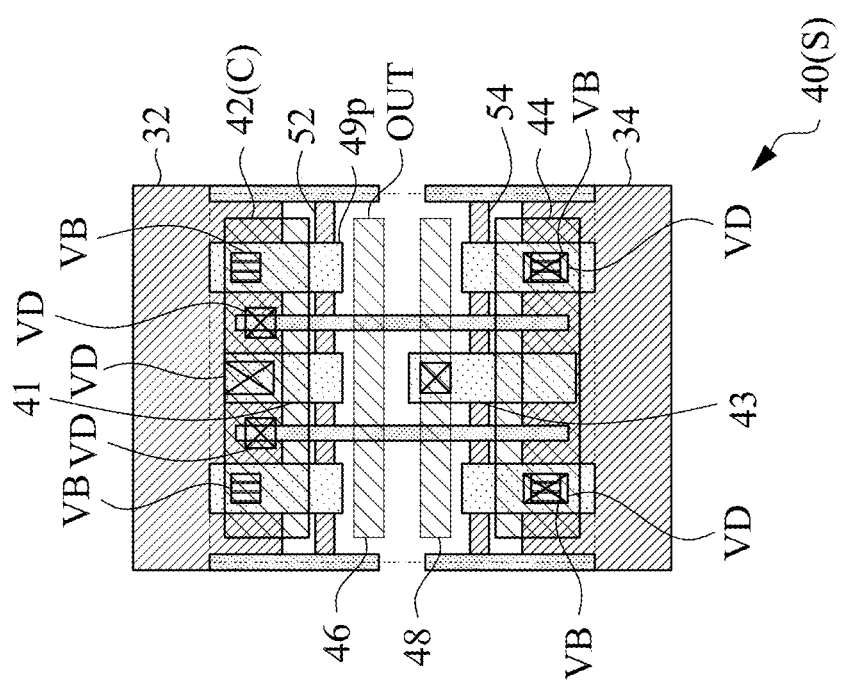

In other embodiments, the power pick-up cell 40 having the first power pad 42 is implemented with the tie-high circuit as shown in FIG. 12, and the power pick-up cell 40 having the second power pad 44 is implemented with the tie-low circuit as shown in FIG. 13. In FIGS. 12-13, the sources of the two p-channel transistors are connected to the first power supply VDD through the conductive segments 47p and 49p. The sources of the two n-channel transistors are connected to the second power supply VSS through the conductive segments 47n and 49n.

In FIG. 12, the conductive segment 41 connects the drains of the two p-channel transistors to the horizontal conducting track 46 through via VD. The gates of the two p-channel transistors and the two n-channel are connected together with the horizontal conducting track 44(C) that are connected to the gate-strips (e.g., 51 and 53) through two vias VG. The drains of the two n-channel transistors are also connected to the horizontal conducting track 44(C) through via VD. The output of the tie-high circuit is on the horizontal conducting track 46. Because the first power pad 42 is connected to the conductive segments 47p and 49p through two vias VD while each of the conductive segments 47p and 49p is connected to the first buried power rail 32 through via VB, the first power pad 42 is conductively connected to the first buried power rail 32.

In FIG. 13, the conductive segment 43 connects the drains of the two n-channel transistors to the horizontal conducting track 48 through via VD. The gates of the two p-channel transistors and the two n-channel are connected together with the horizontal conducting track 42(C) that are connected to the gate-strips (e.g., 51 and 53) through two vias VG. The drains of the two p-channel transistors are also connected to the horizontal conducting track 42(C) through via VD. The output of the tie-low circuit is on the horizontal conducting track 48. Because the second power pad 44 is connected to the conductive segments 47n and 49n through two vias VD while each of the conductive segments 47n and 49n is connected to the second buried power rail 34 through via VB, the second power pad 44 is conductively connected to the second buried power rail 34. While each of the power pick-up cells in FIG. 12 and FIG. 13 provides one power pad, people skilled in the art can recognize that it is possible to design a power pick-up, with two power pads, that includes both a tie-high circuit and tie-low circuit, by combining the power pick-up cells in FIG. 12 and FIG. 13.

Figure 14:
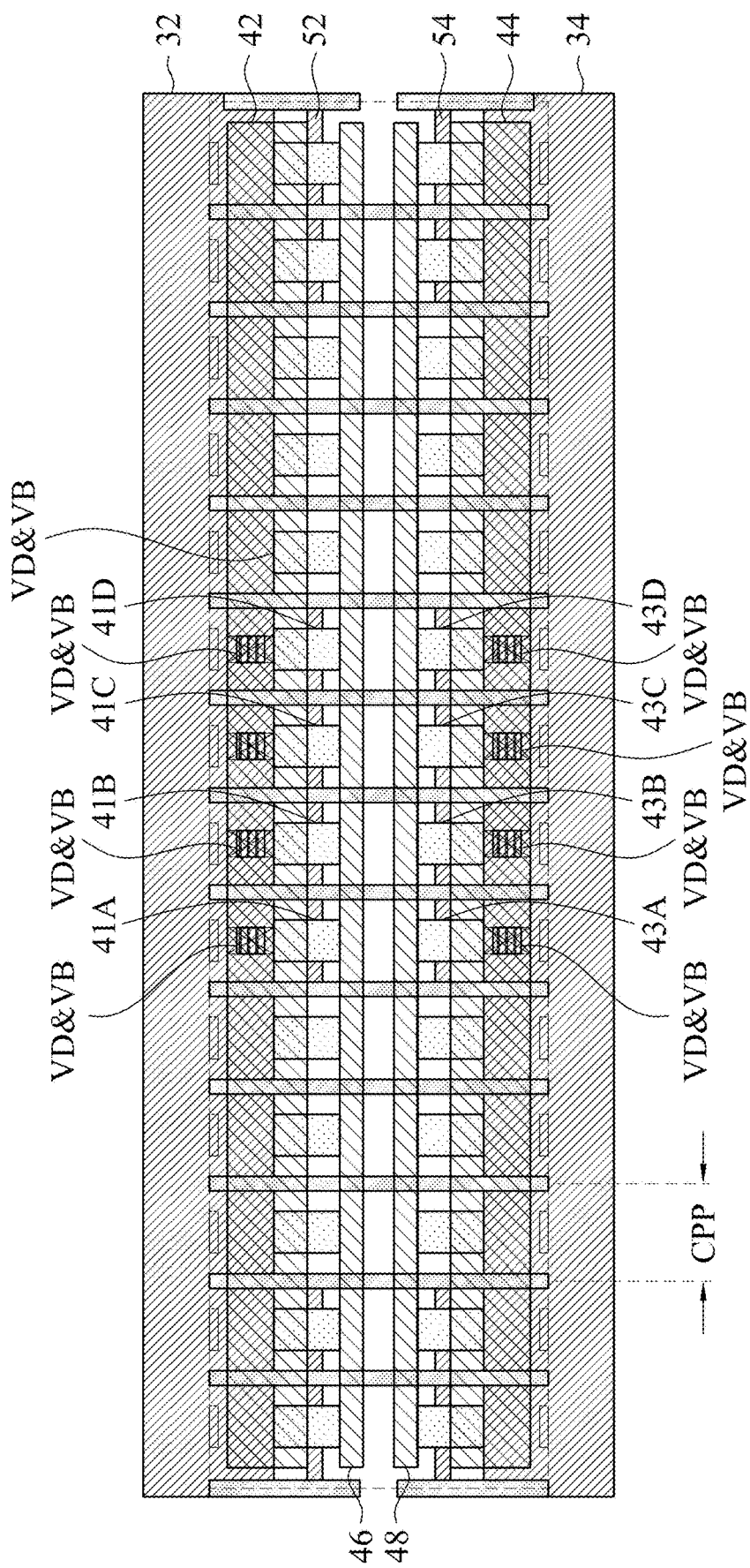
FIG. 14 is a schematic diagram of a tap cell that includes a power pick-up cell as a sub-cell, in accordance with some embodiments.

In still another embodiment, as shown in FIG. 14, the power pick-up cell 40 having the first power pad 42 and the second power pad 44 are implemented with the TAP cell, which can be used to bias the body base of a p-channel transistor to the first supply voltage VDD and to bias the body base of a n-channel transistor to the second supply voltage VSS. Each of the conductive segments 41A, 41B, 41C, and 41D is connected to the first buried power rail 32 through vias VB and is connected to the first power pad 42 through vias VD. Each of the conductive segments 43A, 43B, 43C, and 43D is connected to the second buried power rail 34 through vias VB and is connected to the second power pad 44 through vias VD. With the power pick-up cell 40 implemented with the TAP cell, the first power pad 42 and the second power pad 44 are correspondingly connected to the first buried power rail 32 and the second buried power rail 34.

Figure 15:
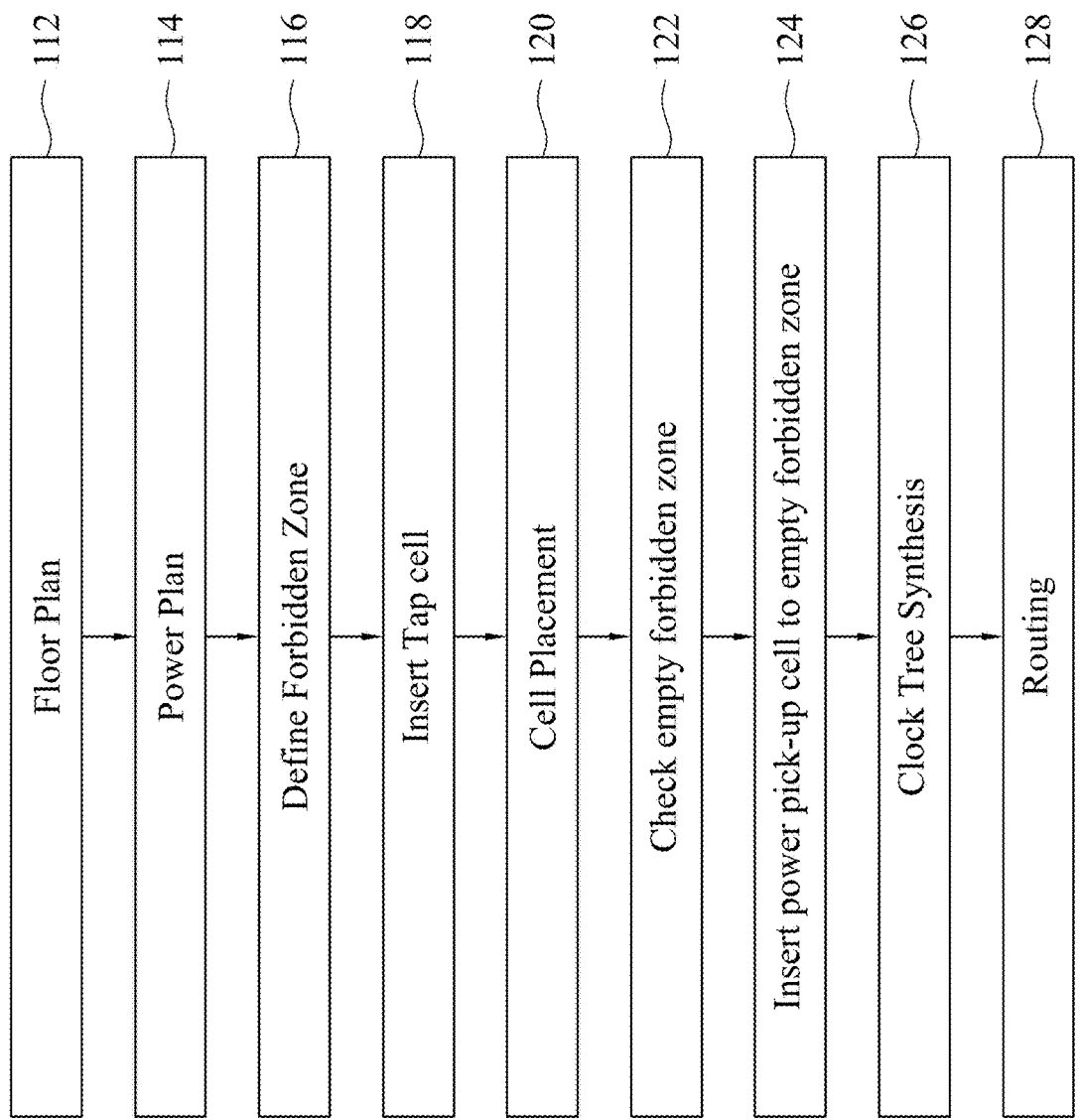
FIG. 15 is a diagram of a flowchart of a process of creating a layout design of IC circuits, in accordance with some embodiments.

FIG. 15 is a flowchart of a process of creating a layout design of IC circuits, in accordance with some embodiments. In this process, a layout plan is created during process 112, a power plan is created during process 114, and forbidden zones are defined during process 116. A forbidden zone is an area in a layout design in which a traditional power pick up structure may prevent standard cells from being placed inside. During the layout plan creation process 112, a chip boundary is created and SRAM blocks are positioned in the layout. During the power plan creation process 114, buried power rails extending in a first direction are placed in positions as designed, upper power rails extending in a direction that is perpendicular to the first direction are placed in positions as designed. At 116, forbidden zones are defined based on an assumption that standard cells should not overlap with any part of a power pick up structure.

In one embodiment of positioning the upper power rails, as shown in FIG. 3, a first upper power rail and a second upper power rail are grouped as an upper power rail pair, and the pitch between two upper power rail pairs is at least ten times larger than the pitch between the first upper power rail and the second upper power rail in a same upper power rail pair. In FIG. 3, the pitch (labeled as $L_{DD}$) between two neighboring first upper power rails 31 is much larger than the pitch (labeled as $L_{DS}$) between neighboring first upper power rail 31 and second upper power rail 33. In one or more embodiments, the pitch $L_{DD}$ is implemented to be at least 10 times the size of the pitch $L_{DS}$, at least 15 times the size of the pitch $L_{DS}$, at least 20 times the size of the pitch $L_{DS}$, or at least 30 times the size of the pitch $L_{DS}$. In another embodiment of positioning the upper power rails, as shown in FIG. 9, the first upper power rails and the second upper power rails are positioned in alternation, with substantially uniform separation between two neighboring upper power rails. In FIG. 9, the pitch $L_{DD}$ is about two times the value of the pitch $L_{DS}$. In the layout design of FIG. 9, the width of a standard cell that can be positioned into the layout cannot exceed $L_{DD}/2$. In the layout design of FIG. 3, the width of a standard cell that can be positioned into the layout cannot exceed $L_{DD}-L_{DS}$.

In both the layout design of FIG. 3 and the layout design of FIG. 9, the restricted areas where the standard cells are not allowed to be placed will reduce the total area that can be used for placing the standard cells. If the $L_{DD}$ in the layout design of FIG. 3 is equal to the $L_{DD}$ in the layout design of FIG. 9, the layout design of FIG. 3 will have smaller restricted areas than the layout design of FIG. 9. When $L_{DD}$ is much larger than $L_{DS}$, the separation $L_{DD}-L_{DS}$ will be larger than the separation $L_{DD}/2$. A standard cell that cannot be placed into the layout design of FIG. 9 may nevertheless be possibly placed into the layout design of FIG. 3.

With some design rules, the pitch $L_{DD}$ is measured in terms of contact poly pitch (CPP), which is the smallest separation between the two poly-lines, as shown in the examples of FIG. 4A, FIG. 5A, and FIG. 14. In one specific example, the pitch $L_{DD}$ is at 24 CPP, and $L_{DD}/2$ is 12 CPP. A standard cell with a width of 13 CPP cannot be placed into the layout design of FIG. 9, but it can be placed into the layout design of FIG. 3. With some design rules, the pitch $L_{DS}$ is measured in terms of a metal pitch $L_{MM2}$ in the second metal layer M1, and the pitch $L_{DS}$ is not allowed to be less than the metal pitch $L_{MM2}$. The value of $L_{DS}$ is selected to be no larger than three times the metal pitch $L_{MM2}$, so that the value of $L_{DD}-L_{DS}$ can be reduced.

Figure 16A:
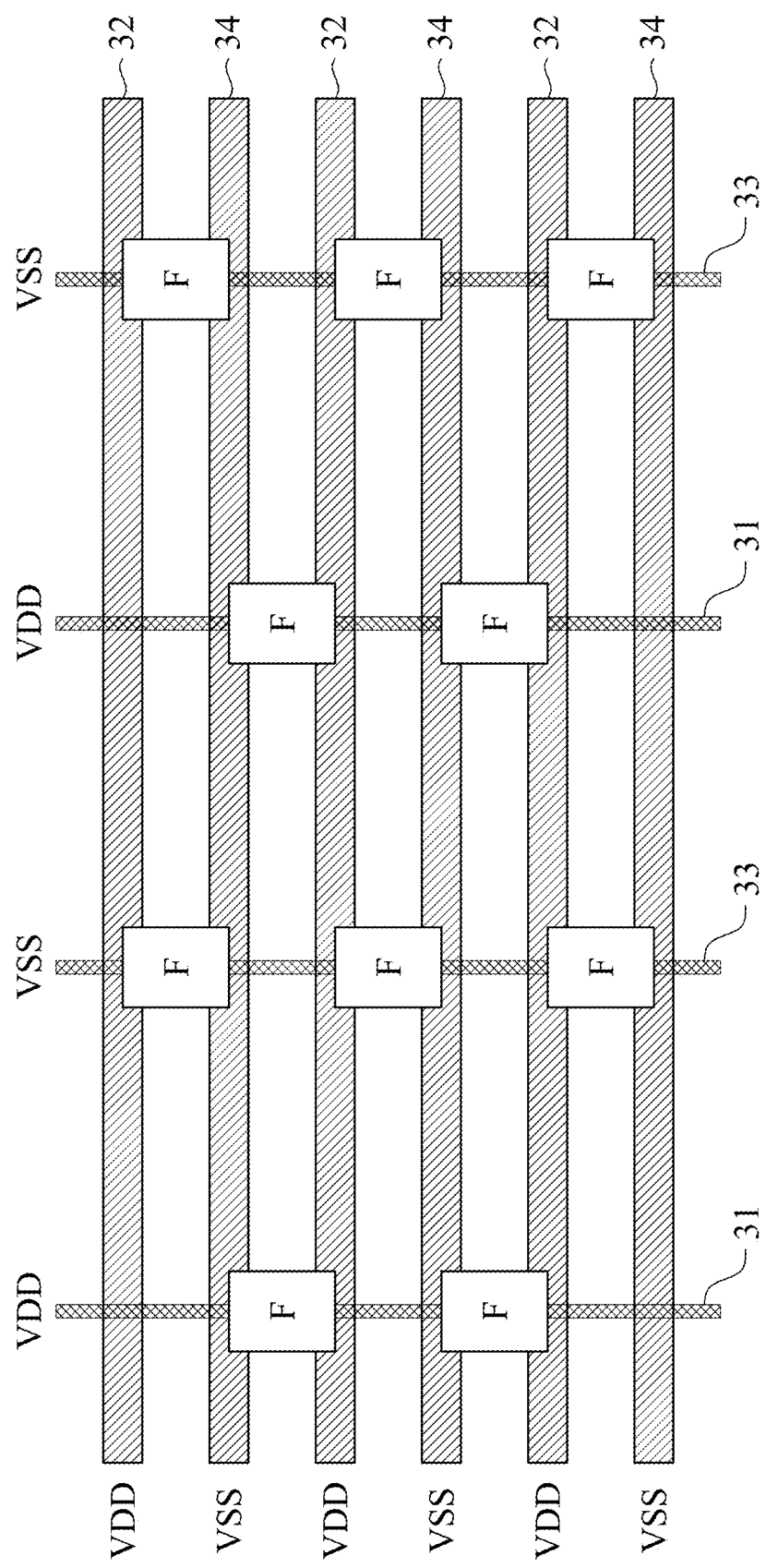
FIGS. 16A-16B are schematic diagrams of a distribution of defined forbidden zones, in accordance with some embodiments.
Figure 16B:
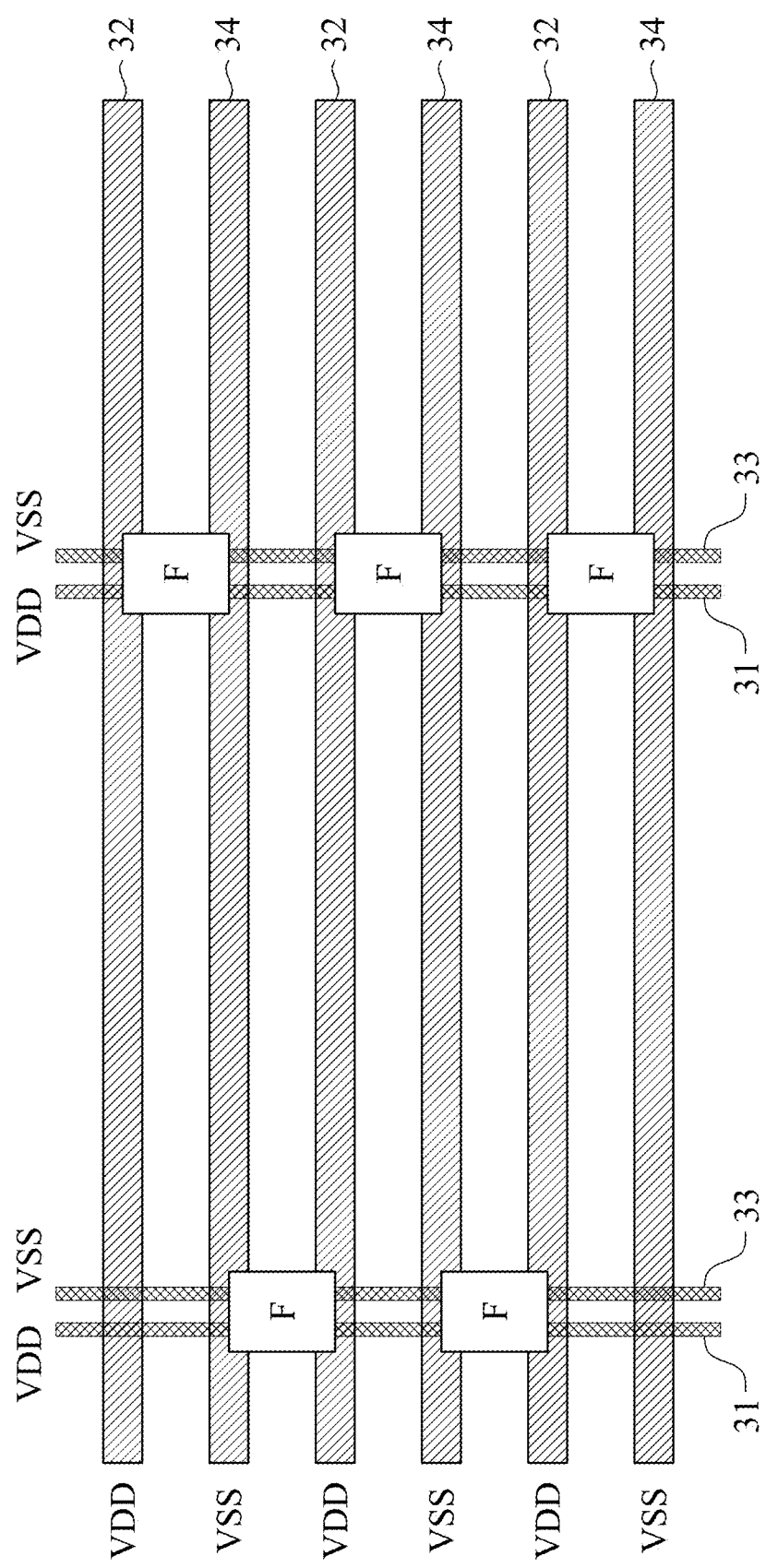

FIGS. 16A and 16B are schematic diagrams a distribution of the defined forbidden zones (each labeled with a letter "F"), in accordance with some embodiments. Each of the defined forbidden zones as shown in FIGS. 16A and 16B is located in a row between one buried power rail 32 and one second buried power rail 34. In the embodiments as shown in FIG. 16A, the first upper power rail 31 and second upper power rail 33 are positioned in alternation to form the power rail array, with substantially uniform separation between two neighboring upper power rails. Each of the defined forbidden zones as shown in the figure overlaps with either the first upper power rail 31 or second upper power rail 33. In the embodiments as shown in FIG. 16B, each of the upper power rail pairs as shown in the figure is formed with one first upper power rail 31 and one second upper power rail 33 closely positioned to each other. Each of the defined forbidden zones as shown in the figure overlaps with one of the upper power rail pairs.

Figure 17A:
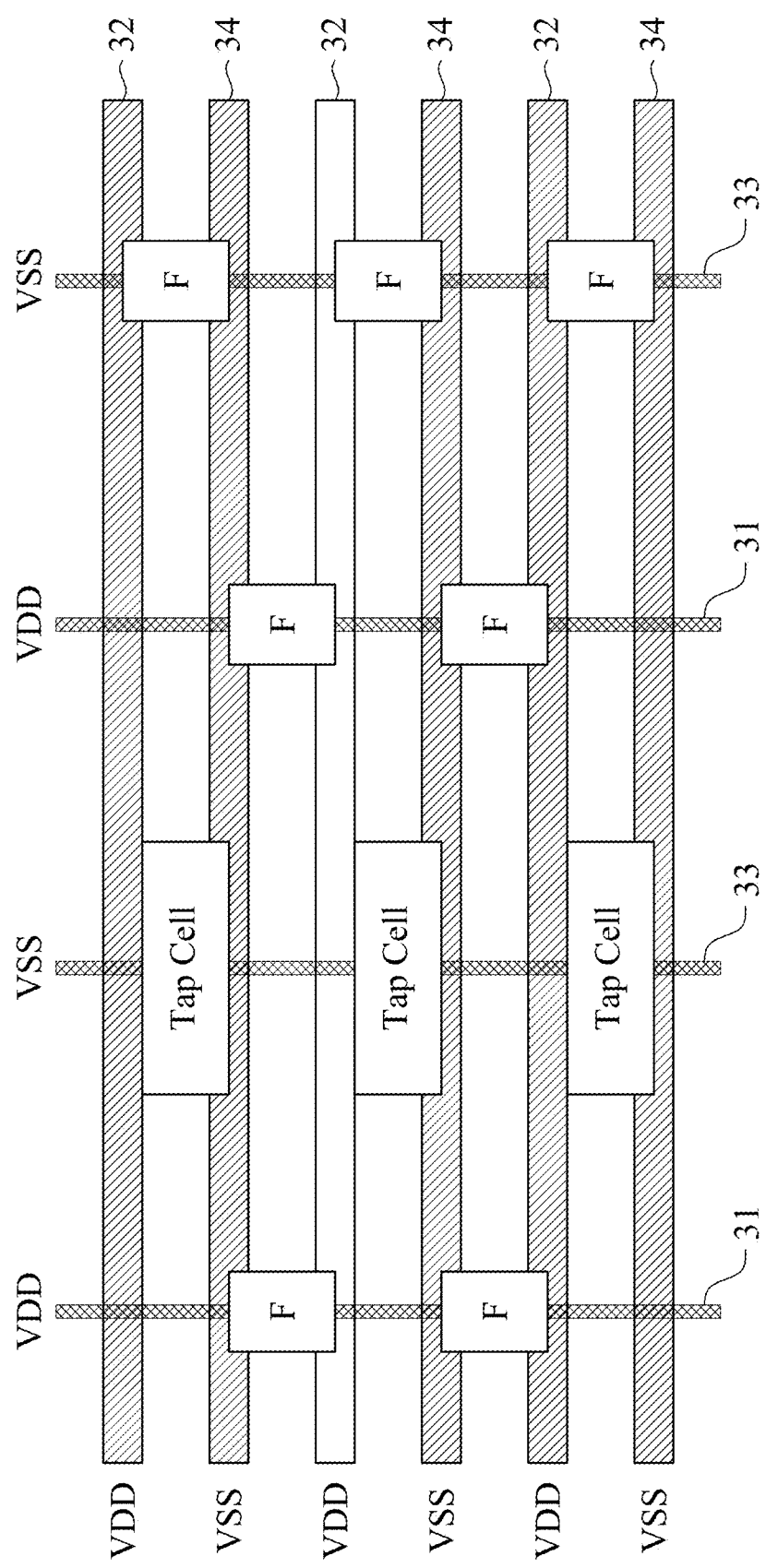
FIGS. 17A-17B are schematic diagrams of defined forbidden zones and the inserted tap cells, in accordance with some embodiments.
Figure 17B:
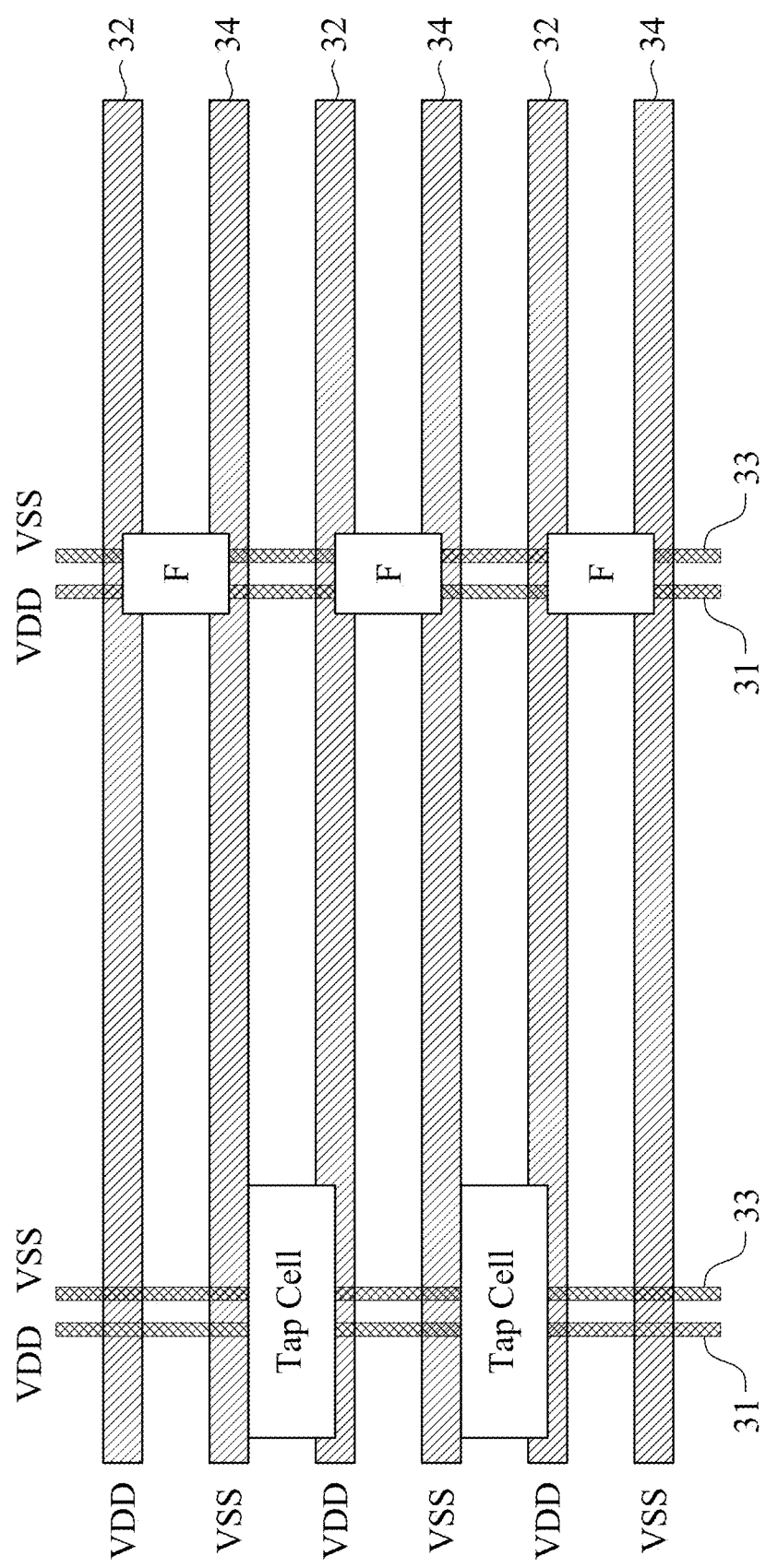

Returning to the process of FIG. 15, after the forbidden zones are defined, tap cells are inserted at the locations of some selected forbidden zones during process 118 based on a designer's preference. Not all forbidden zones include tap cells. The width of the tap cell is larger than width of the forbidden zone. FIGS. 17A and 17B are schematic diagrams the defined forbidden zones along with some inserted tap cells, in accordance with some embodiments. Examples of the inserted tap cells include the tap cell in FIG. 14, which can be used to connect the first upper power rail 31 with the first buried power rail 32 and/or to connect the second upper power rail 33 with the second buried power rail 34.

Figure 18A:
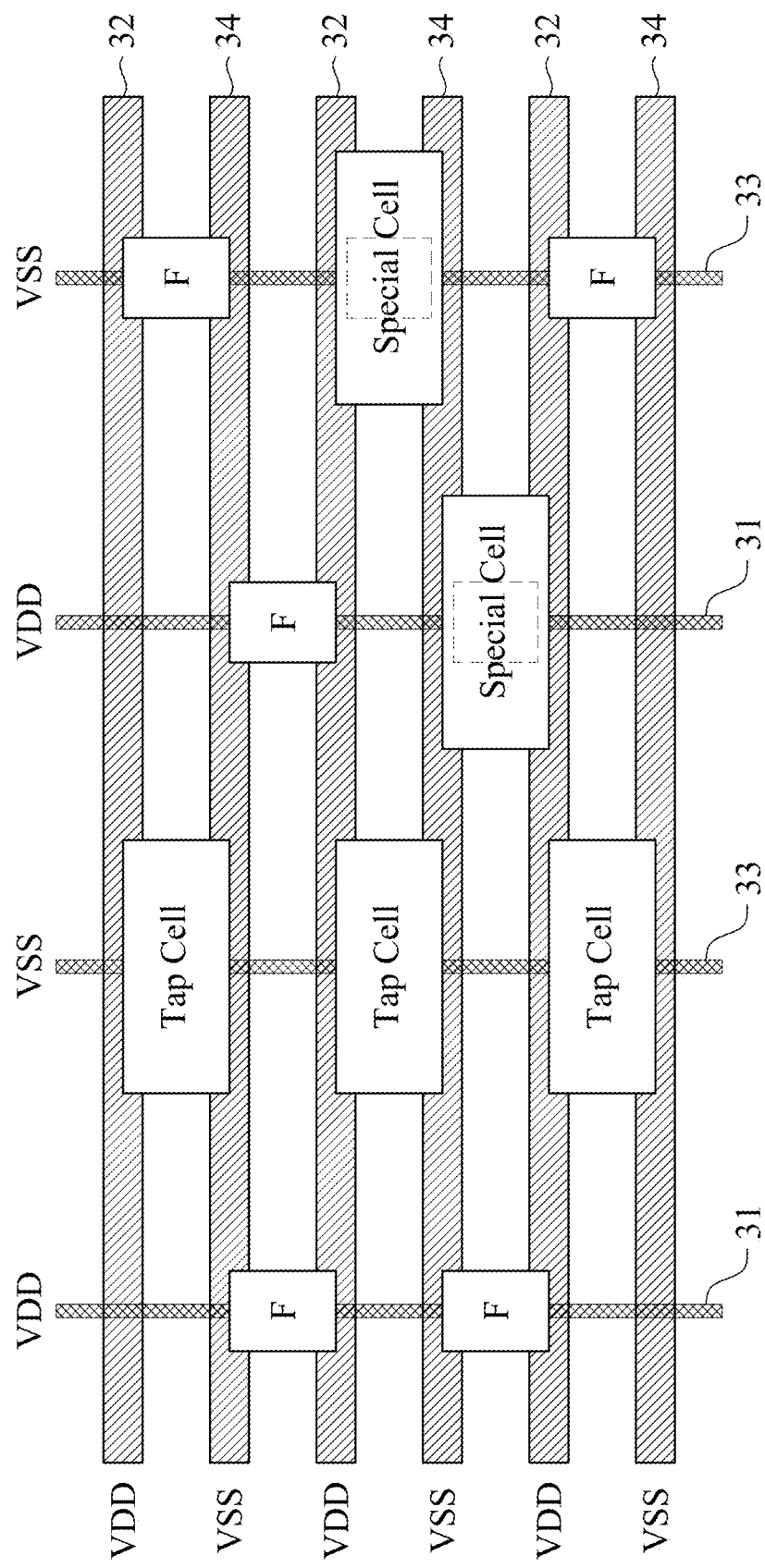
FIGS. 18A-18B are schematic diagrams of the placement of some special cells, in accordance with some embodiments.
Figure 18B:
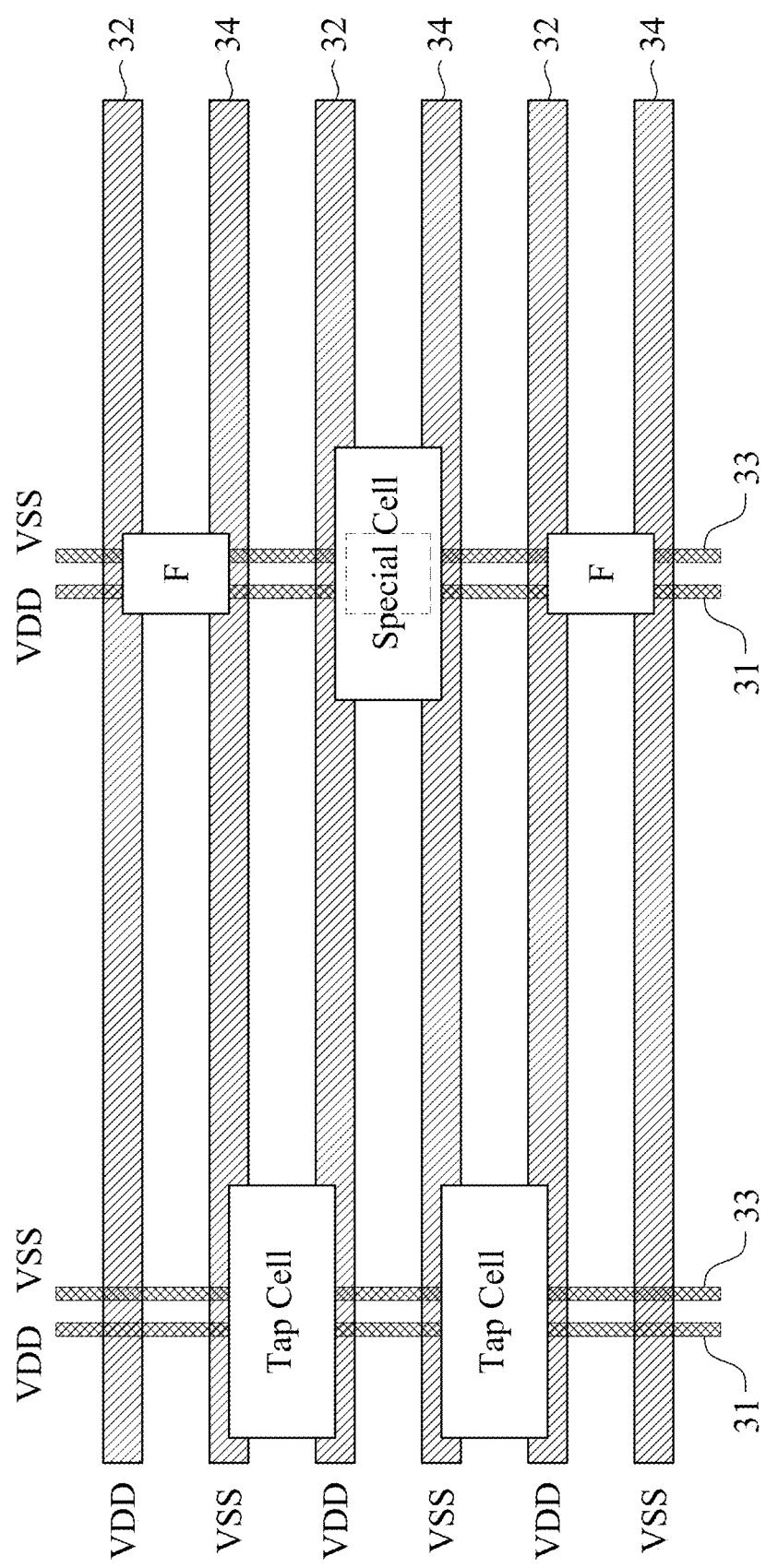

Returning to the process of FIG. 15, after tap cells are inserted, standard cells and special cells are placed in the layout during process 120. The design rules do not allow placement of a normal standard cell in locations which would cause such normal standard cell to overlap with the forbidden zones. The special cell, however, can overlap with the forbidden zones. FIGS. 18A and 18B are schematic diagrams the placement of some special cells, in accordance with some embodiments. In some embodiments, a special cell includes a power pick-up cell 40 as a sub-cell and uses the logical function of the power pick-up cell 40 inside the special cell to combine with other logic gates in the special cell, for implementing the needed function of the special cell. In some embodiments, the power pick-up cell 40 in a special cell is a power pick-up cell with two power pads or a power pick-up cell with one power pad. Examples of the power pick-up cell 40 with two power pads includes the power pick-up cell in FIGS. 4A-4D, FIGS. 5A-5D, and FIGS. 11A-11C. Examples of the power pick-up cell 40 with one power pad includes the power pick-up cell in FIGS. 7A-7D and FIGS. 8A-8D, and FIGS. 12-13. These power pick-up cells 40 also provide example logical functions (e.g., inverter, buffer, NAND gate, NOR gate, tie-high circuit, or tie-low circuit) that are combinable with other logic gates in the special cell.

Figure 19A:
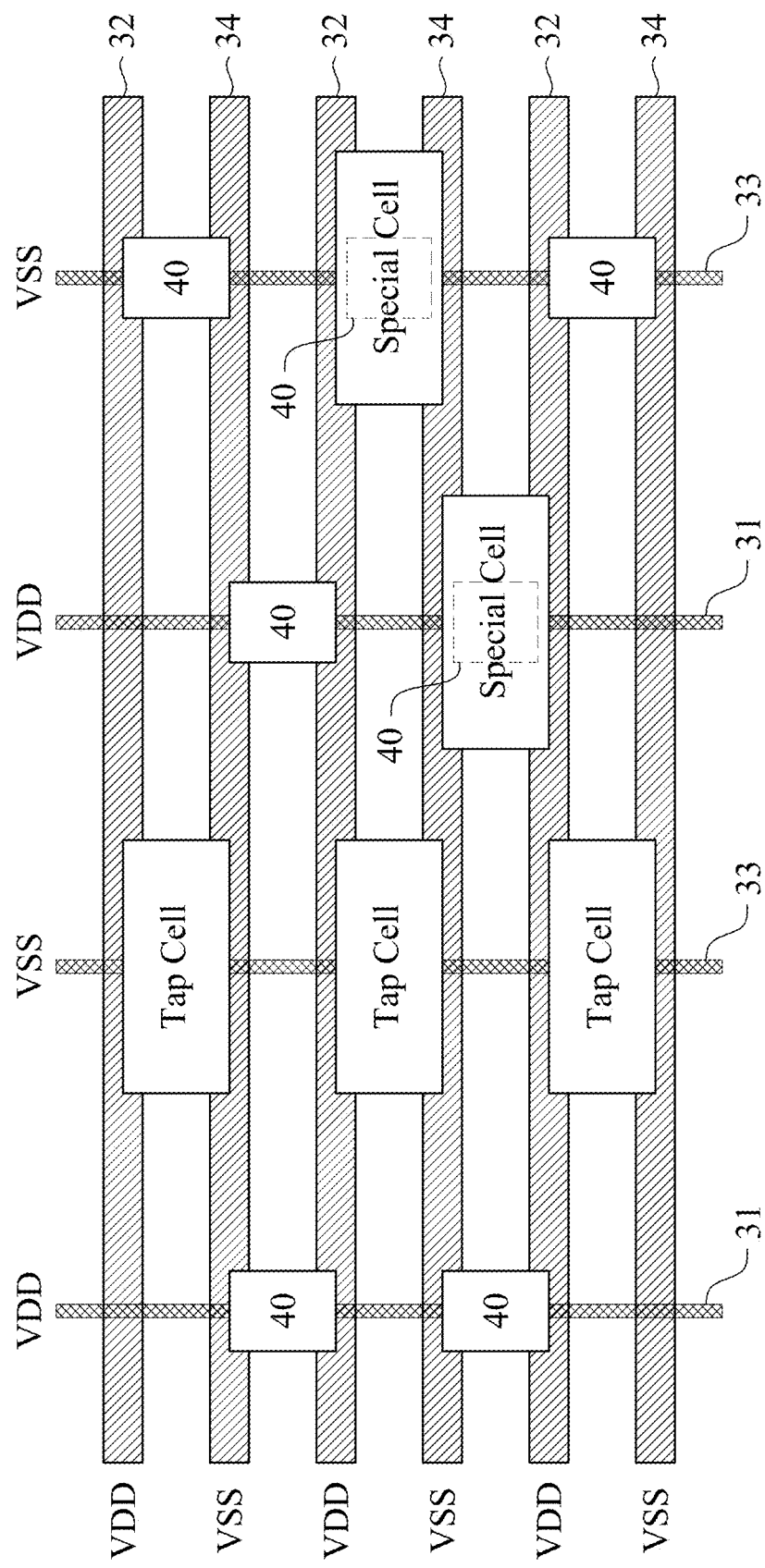
FIGS. 19A-19B are schematic diagrams of the placement of power pick-up cells at previously empty forbidden zones, in accordance with some embodiments.
Figure 19B:
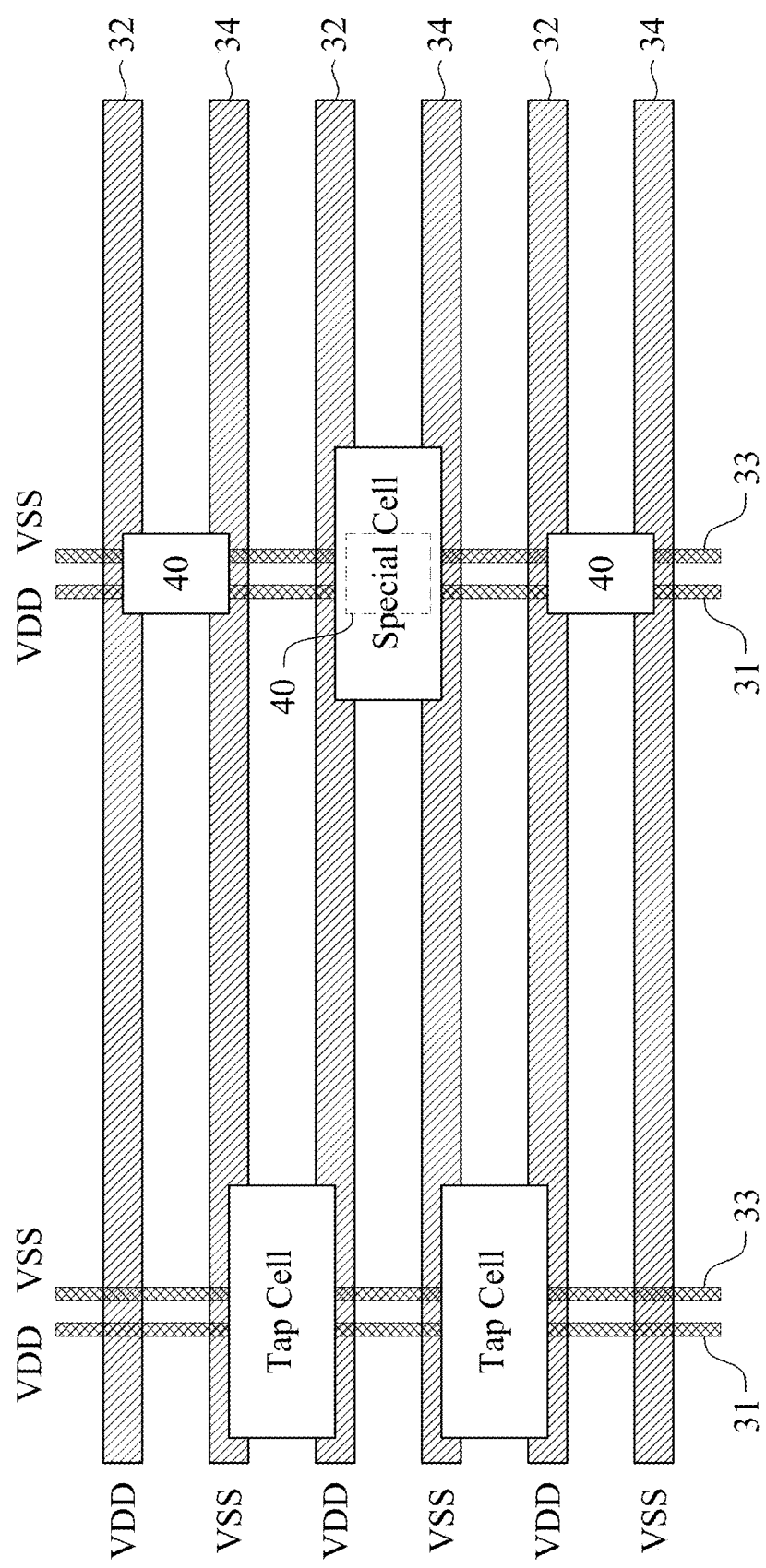

Returning to the process of FIG. 15, after the placement of the special cells, empty forbidden zones are searched at 122; then, at 124, power pick-up cells are placed at some of the empty forbidden zones to provide improved power delivery from the upper power rails to the buried power rail or to provide improved circuit densities. The placement of power pick-up cells 40 at previously empty forbidden zones is illustrated in FIGS. 19A and 19B, in accordance with some embodiments. Next, at 126, during clock tree synthesis is performed to minimize skew and insertion delay; at 128, routing design allocates routing resources for connections and tracks assignment for individual nets.

Figure 20:
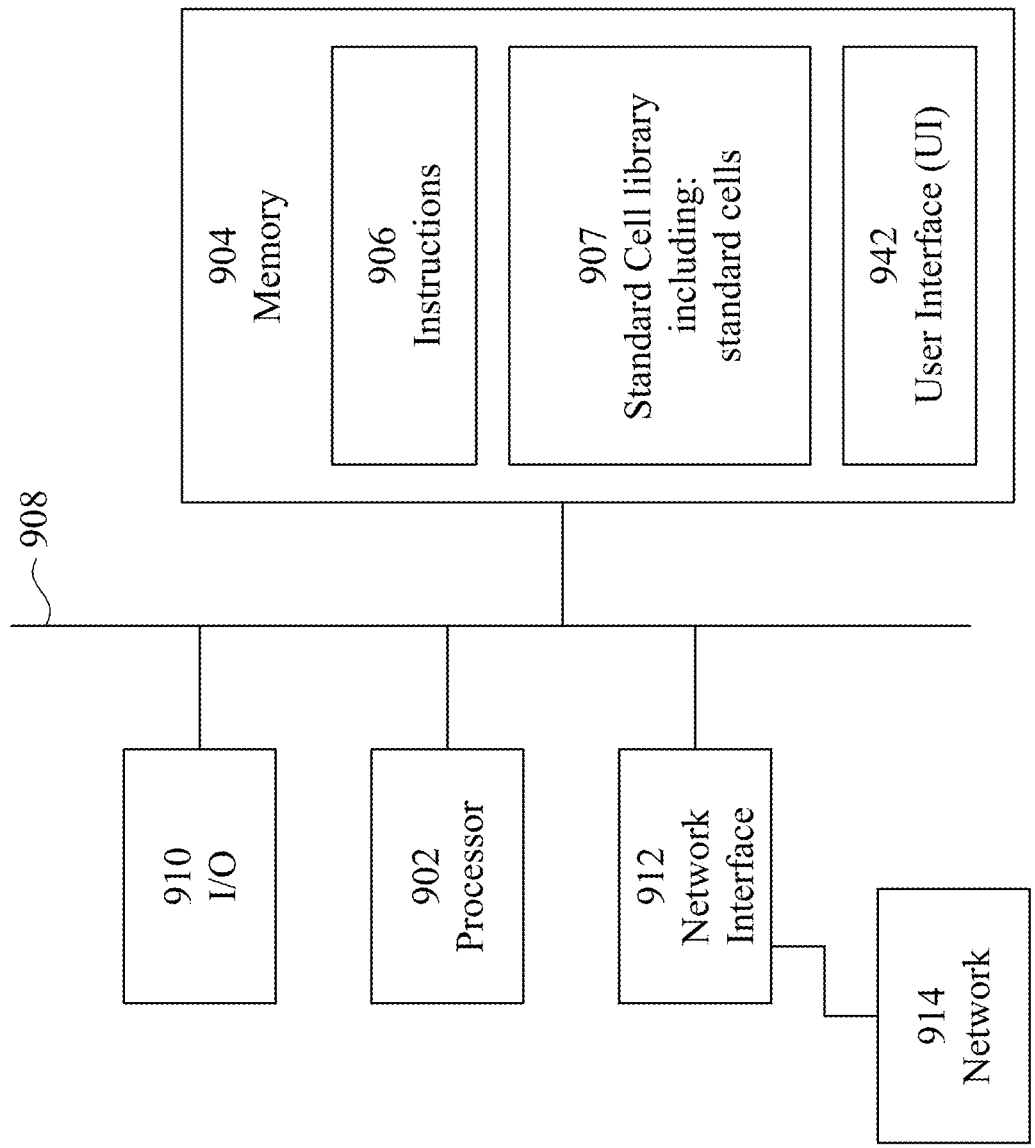
FIG. 20 is a block diagram of an electronic design automation (EDA) system in accordance with some embodiments.

FIG. 20 is a block diagram of an electronic design automation (EDA) system 900 in accordance with some embodiments.

In some embodiments, EDA system 900 includes an APR system. Methods described herein of designing layout diagrams represent wire routing arrangements, in accordance with one or more embodiments, are implementable, for example, using EDA system 900, in accordance with some embodiments.

In some embodiments, EDA system 900 is a general purpose computing device including a hardware processor 902 and a non-transitory, computer-readable storage medium 904. Storage medium 904, amongst other things, is encoded with, i.e., stores, computer program code 906, i.e., a set of executable instructions. Execution of instructions 906 by hardware processor 902 represents (at least in part) an EDA tool which implements a portion or all of, e.g., the methods described herein in accordance with one or more embodiments (hereinafter, the noted processes and/or methods).

Processor 902 is electrically coupled to computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause system 900 to be usable for performing a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause system 900 (where such execution represents (at least in part) the EDA tool) to be usable for performing a portion or all of the noted processes and/or methods. In one or more embodiments, storage medium 904 also stores information which facilitates performing a portion or all of the noted processes and/or methods. In one or more embodiments, storage medium 904 stores library 907 of standard cells including such standard cells as disclosed herein.

EDA system 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

EDA system 900 also includes network interface 912 coupled to processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 900.

System 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. EDA system 900 is configured to receive information related to a UI through I/O interface 910. The information is stored in computer-readable medium 904 as user interface (UI) 942.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 900. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 21:
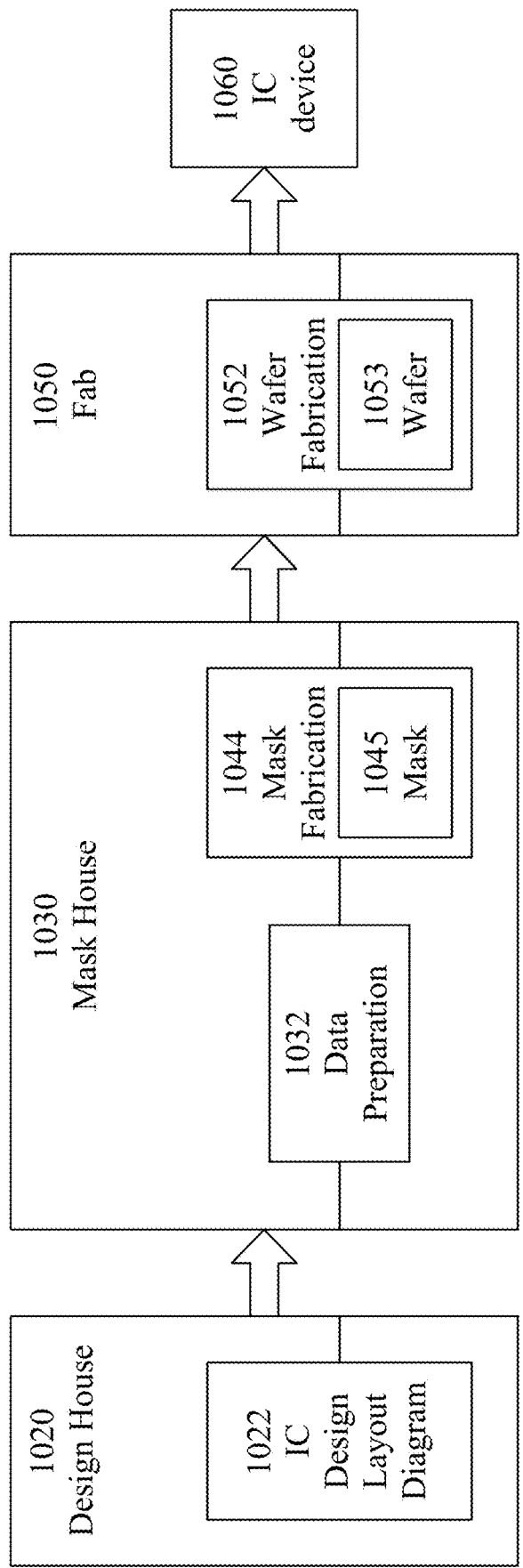
FIG. 21 is a block diagram of an integrated circuit (IC) manufacturing system, and an IC manufacturing flow associated therewith, in accordance with some embodiments.

FIG. 21 is a block diagram of an integrated circuit (IC) manufacturing system 1000, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1000.

In FIG. 21, IC manufacturing system 1000 includes entities, such as a design house 1020, a mask house 1030, and an IC manufacturer/fabricator ("fab") 1050, that interact with one another in the design, development, and manufacturing cycles and/or services related to manufacturing an IC device 1060. The entities in system 1000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1020, mask house 1030, and IC fab 1050 is owned by a single larger company. In some embodiments, two or more of design house 1020, mask house 1030, and IC fab 1050 coexist in a common facility and use common resources.

Design house (or design team) 1020 generates an IC design layout diagram 1022. IC design layout diagram 1022 includes various geometrical patterns designed for an IC device 1060. The geometrical patterns correspond to patterns of metal, oxide, or semiconductor layers that make up the various components of IC device 1060 to be fabricated. The various layers combine to form various IC features. For example, a portion of IC design layout diagram 1022 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1020 implements a proper design procedure to form IC design layout diagram 1022. The design procedure includes one or more of logic design, physical design or place and route. IC design layout diagram 1022 is presented in one or more data files having information of the geometrical patterns. For example, IC design layout diagram 1022 can be expressed in a GDSII file format or DFII file format.

Mask house 1030 includes data preparation 1032 and mask fabrication 1044. Mask house 1030 uses IC design layout diagram 1022 to manufacture one or more masks 1045 to be used for fabricating the various layers of IC device 1060 according to IC design layout diagram 1022. Mask house 1030 performs mask data preparation 1032, where IC design layout diagram 1022 is translated into a representative data file ("RDF"). Mask data preparation 1032 provides the RDF to mask fabrication 1044. Mask fabrication 1044 includes a mask writer. A mask writer converts the RDF to an image on a substrate, such as a mask (reticle) 1045 or a semiconductor wafer 1053. The design layout diagram 1022 is manipulated by mask data preparation 1032 to comply with particular characteristics of the mask writer and/or requirements of IC fab 1050. In FIG. 21, mask data preparation 1032 and mask fabrication 1044 are illustrated as separate elements. In some embodiments, mask data preparation 1032 and mask fabrication 1044 can be collectively referred to as mask data preparation.

In some embodiments, mask data preparation 1032 includes optical proximity correction (OPC) which uses lithography enhancement techniques to compensate for image errors, such as those that can arise from diffraction, interference, other process effects and the like. OPC adjusts IC design layout diagram 1022. In some embodiments, mask data preparation 1032 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1032 includes a mask rule checker (MRC) that checks the IC design layout diagram 1022 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1022 to compensate for limitations during mask fabrication 1044, which may undo part of the modifications performed by OPC in order to meet mask creation rules.

In some embodiments, mask data preparation 1032 includes lithography process checking (LPC) that simulates processing that will be implemented by IC fab 1050 to fabricate IC device 1060. LPC simulates this processing based on IC design layout diagram 1022 to create a simulated manufactured device, such as IC device 1060. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1022.

It should be understood that the above description of mask data preparation 1032 has been simplified for the purposes of clarity. In some embodiments, data preparation 1032 includes additional features such as a logic operation (LOP) to modify the IC design layout diagram 1022 according to manufacturing rules. Additionally, the processes applied to IC design layout diagram 1022 during data preparation 1032 may be executed in a variety of different orders.

After mask data preparation 1032 and during mask fabrication 1044, a mask 1045 or a group of masks 1045 are fabricated based on the modified IC design layout diagram 1022. In some embodiments, mask fabrication 1044 includes performing one or more lithographic exposures based on IC design layout diagram 1022. In some embodiments, an electron-beam (e-beam) or a mechanism of multiple e-beams is used to form a pattern on a mask (photomask or reticle) 1045 based on the modified IC design layout diagram 1022. Mask 1045 can be formed in various technologies. In some embodiments, mask 1045 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1045 includes a transparent substrate (e.g., fused quartz) and an opaque material (e.g., chromium) coated in the opaque regions of the binary mask. In another example, mask 1045 is formed using a phase shift technology. In a phase shift mask (PSM) version of mask 1045, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1044 is used in a variety of processes. For example, such a mask(s) is used in an ion implantation process to form various doped regions in semiconductor wafer 1053, in an etching process to form various etching regions in semiconductor wafer 1053, and/or in other suitable processes.

IC fab 1050 includes wafer fabrication 1052. IC fab 1050 is an IC fabrication business that includes one or more manufacturing facilities for the fabrication of a variety of different IC products. In some embodiments, IC Fab 1050 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1050 uses mask(s) 1045 fabricated by mask house 1030 to fabricate IC device 1060. Thus, IC fab 1050 at least indirectly uses IC design layout diagram 1022 to fabricate IC device 1060. In some embodiments, semiconductor wafer 1053 is fabricated by IC fab 1050 using mask(s) 1045 to form IC device 1060. In some embodiments, the IC fabrication includes performing one or more lithographic exposures based at least indirectly on IC design layout diagram 1022. Semiconductor wafer 1053 includes a silicon substrate or other proper substrate having material layers formed thereon. Semiconductor wafer 1053 further includes one or more of various doped regions, dielectric features, multilevel interconnects, and the like (formed at subsequent manufacturing steps).

Details regarding an integrated circuit (IC) manufacturing system (e.g., system 1000 of FIG. 21), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

One aspect of this description relates to an integrated circuit. The integrated circuit includes a substrate, a first metal layer overlying the substrate, a first buried power rail, a second buried power rail, a first power pad in the first metal layer, and a first conductive segment beneath the first metal layer. The first buried power rail and the second buried power rail while extending in a first direction are both located beneath the first metal layer. The first power pad is configured to receive a first supply voltage through at least one first via. The first conductive segment is conductively connected to the first power pad through at least one second via between the first conductive segment and the first metal layer. The first conductive segment is conductively connected to the first buried power rail through at least one third via between the first conductive segment and the first buried power rail.

Another aspect of this description relates to an integrated circuit. The integrated circuit includes a substrate, a first metal layer overlying the substrate, a first power pad in the first metal layer, a first conductive segment beneath the first metal layer, a second power pad in the first metal layer, and a second conductive segment beneath the first metal layer. The first power pad is configured to receive a first supply voltage through at least one first via. The first conductive segment is conductively connected to the first power pad through at least one second via between the first conductive segment and the first metal layer. The second power pad is configured to receive a second supply voltage. The second conductive segment is conductively connected to the second power pad through at least one second via between the second conductive segment and the first metal layer. The first conductive segment is configured to deliver the first supply voltage to a first buried power rail extending in a first direction and beneath the first metal layer. The second conductive segment is configured to deliver the second supply voltage to a second buried power rail extending in the first direction and beneath the first metal layer.

Still another aspect of this description relates to an integrated circuit. The integrated circuit includes a substrate, a first metal layer overlying the substrate, a first buried power rail, a second buried power rail, a first power pad in the first metal layer, and a first conductive segment beneath the first metal layer. The first buried power rail and the second buried power rail while extending in a first direction and are both located beneath the first metal layer. The first power pad is configured to receive a first supply voltage through at least one first via. The first conductive segment is conductively connected to the first power pad. The integrated circuit also includes a second via conductively connected between the first conductive segment and the first power pad, and a third via conductively connected between the first conductive segment and the first buried power rail.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An integrated circuit comprising:
   a substrate;
   a first metal layer overlying the substrate;
   a first buried power rail and a second buried power rail both extending in a first direction and located beneath the first metal layer;
   a first power pad in the first metal layer and configured to receive a first supply voltage through at least one first via; and
   a first conductive segment beneath the first metal layer and conductively connected to the first power pad through at least one second via between the first conductive segment and the first metal layer; and
   wherein the first conductive segment is conductively connected to the first buried power rail through at least one third via between the first conductive segment and the first buried power rail.

2. The integrated circuit of claim 1, further comprising a first upper power rail in a second metal layer overlying the first metal layer and extending in a direction that is perpendicular to the first direction, wherein the first upper power rail is conductively connected to the first power pad.

3. The integrated circuit of claim 1, wherein the first power pad and the first conductive segment are within a functional circuit.

4. The integrated circuit of claim 3, wherein the functional circuit includes a NAND gate, a NOR gate, an inverter, or a buffer.

5. The integrated circuit of claim 1, further comprising:
   a second power pad in the first metal layer and configured to receive a second supply voltage;
   a second conductive segment beneath the first metal layer and conductively connected to the second power pad through at least another second via between the second conductive segment and the first metal layer; and
   wherein the second conductive segment is conductively connected to the second buried power rail through at least another third via between the second conductive segment and the second buried power rail.

6. The integrated circuit of claim 5, further comprising a second upper power rail in a second metal layer overlying the first metal layer and extending in a direction perpendicular to the first direction, wherein the second upper power rail is conductively connected to the second power pad.

7. An integrated circuit comprising:
   a substrate;
   a first metal layer overlying the substrate;
   a first power pad in the first metal layer and configured to receive a first supply voltage through at least one first via;
   a first conductive segment beneath the first metal layer and conductively connected to the first power pad through at least one second via between the first conductive segment and the first metal layer;
   a second power pad in the first metal layer and configured to receive a second supply voltage; and
   a second conductive segment beneath the first metal layer and conductively connected to the second power pad through at least one second via between the second conductive segment and the first metal layer;
   wherein the first conductive segment is configured to deliver the first supply voltage to a first buried power rail extending in a first direction and beneath the first metal layer; and
   wherein the second conductive segment is configured to deliver the second supply voltage to a second buried power rail extending in the first direction and beneath the first metal layer.

8. The integrated circuit of claim 7, further comprising:
   a first upper power rail conductively connected to the first power pad;
   a second upper power rail conductively connected to the second power pad; and wherein both the first upper power rail and the second upper power rail are in a second metal layer overlying the first metal layer and extends in a direction that is perpendicular to the first direction.

9. The integrated circuit of claim 7, wherein the first power pad, the second power pad, the first conductive segment, and the second conductive segment are within a functional circuit.

10. The integrated circuit of claim 9, wherein the functional circuit includes a NAND gate, a NOR gate, an inverter, or a buffer.

11. An integrated circuit comprising:
a substrate;
a first metal layer overlying the substrate;
a first buried power rail and a second buried power rail both extending in a first direction and located beneath the first metal layer;
a first power pad in the first metal layer and configured to receive a first supply voltage through at least one first via;
a first conductive segment beneath the first metal layer and conductively connected to the first power pad;
a second via conductively connected between the first conductive segment and the first power pad; and
a third via conductively connected between the first conductive segment and the first buried power rail.

12. The integrated circuit of claim 11, further comprising:
a first upper power rail conductively connected to the first power pad, wherein the first upper power rail is in a second metal layer overlying the first metal layer.

13. The integrated circuit of claim 11, wherein the first power pad and the first conductive segment are within a functional circuit.

14. The integrated circuit of claim 13, wherein the functional circuit includes a NAND gate, a NOR gate, an inverter, or a buffer.

15. The integrated circuit of claim 11, further comprising:
a second power pad in the first metal layer and configured to receive a second supply voltage; and
a second conductive segment beneath the first metal layer and conductively connected to the second power pad.

16. The integrated circuit of claim 15, further comprising:
an additional second via conductively connected between the second conductive segment and the second power pad.

17. The integrated circuit of claim 15, further comprising:
an additional third via conductively connected between the second conductive segment and the second buried power rail.

18. The integrated circuit of claim 15, further comprising:
a second upper power rail in a second metal layer overlying the first metal layer and extending in a direction perpendicular to the first direction, wherein the second upper power rail is conductively connected to the second power pad.

19. The integrated circuit of claim 15, wherein the first power pad, the second power pad, the first conductive segment, and the second conductive segment are within a functional circuit.

20. The integrated circuit of claim 19, wherein the functional circuit includes a NAND gate, a NOR gate, an inverter, or a buffer.

* * * * *